US007637606B2

(12) United States Patent
Sekiya

(10) Patent No.: US 7,637,606 B2
(45) **Date of Patent: *Dec. 29, 2009**

(54) LIQUID JET APPARATUS, LIQUID JET HEAD, AND LIQUID

(75) Inventor: Takuro Sekiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/101,720

(22) Filed: Apr. 11, 2008

(65) Prior Publication Data

US 2008/0204513 A1 Aug. 28, 2008

Related U.S. Application Data

(62) Division of application No. 11/360,047, filed on Feb. 22, 2006, now Pat. No. 7,374,279, which is a division of application No. 10/659,956, filed on Sep. 11, 2003, now Pat. No. 7,150,521.

(30) Foreign Application Priority Data

Sep. 11, 2002 (JP) ............................. 2002-266064

(51) Int. Cl.
*G01D 11/00* (2006.01)

(52) U.S. Cl. ............................ 347/100; 347/95; 347/40

(58) Field of Classification Search ................. 347/100, 347/96, 95, 101, 84, 85, 86, 40, 44, 20, 42; 106/31.6, 31.13, 31.27; 523/160
See application file for complete search history.

(56) References Cited

U.S. PATENT DOCUMENTS

| | | | |
|---|---|---|---|
| 3,060,429 | A | 10/1962 | Winston |
| 3,298,030 | A | 1/1967 | Lewis et al. |
| 3,416,153 | A | 12/1968 | Hertz et al. |
| 3,596,275 | A | 7/1971 | Sweet |
| 3,747,120 | A | 7/1973 | Stemme |
| 5,293,182 | A | 3/1994 | Sekiya et al. |
| 5,420,618 | A | 5/1995 | Sekiya et al. |

(Continued)

FOREIGN PATENT DOCUMENTS

| | | |
|---|---|---|
| JP | 54-51837 | 4/1979 |

(Continued)

*Primary Examiner*—Manish S Shah
(74) *Attorney, Agent, or Firm*—Cooper & Dunham, LLP

(57) ABSTRACT

A liquid jet head includes a nozzle element having nozzles from which a recording liquid is ejected to a recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the fine particles of the pigment are smaller than fibers of the recording medium, wherein the fine particles of the pigment are smaller than spaces between the fibers of the recording medium.

18 Claims, 13 Drawing Sheets

U.S. PATENT DOCUMENTS

| | | | | |
|---|---|---|---|---|
| 5,610,637 | A | 3/1997 | Sekiya et al. | |
| 5,657,060 | A | 8/1997 | Sekiya et al. | |
| 5,729,257 | A | 3/1998 | Sekiya et al. | |
| 5,754,202 | A | 5/1998 | Sekiya et al. | |
| 5,877,786 | A | 3/1999 | Sekiya et al. | |
| 6,039,425 | A | 3/2000 | Sekiya et al. | |
| 6,193,348 | B1 | 2/2001 | Sekiya et al. | |
| 6,227,639 | B1 | 5/2001 | Sekiya et al. | |
| 6,338,545 | B1 | 1/2002 | Sekiya | |
| 6,554,401 | B2 | 4/2003 | Sekiya | |
| 6,568,778 | B1 | 5/2003 | Sekiya et al. | |
| 6,598,959 | B2 | 7/2003 | Sekiya | |
| 6,764,174 | B2 | 7/2004 | Sekiya | |
| 6,871,940 | B2 | 3/2005 | Sekiya | |
| 6,975,663 | B2 | 12/2005 | Sekiya et al. | |
| 6,992,433 | B2 | 1/2006 | Sekiya | |
| 7,374,279 | B2 * | 5/2008 | Sekiya | 347/100 |

FOREIGN PATENT DOCUMENTS

| | | |
|---|---|---|
| JP | 2-255875 | 10/1990 |
| JP | 4-57859 | 2/1992 |
| JP | 4-57860 | 2/1992 |
| JP | 2000-211124 | 8/2000 |
| JP | 2001-239748 | 9/2001 |
| JP | 2002-121434 | 4/2002 |
| JP | 2002-166643 | 6/2002 |

* cited by examiner

LIQUID JET APPARATUS, LIQUID JET HEAD, AND LIQUID

CROSS-REFERENCE TO RELATED APPLICATIONS

This application is a divisional of Ser. No. 11/360,047, filed Feb. 22, 2006 now U.S. Pat. No. 7,374,279, which in turn is a divisional of Ser. No. 10/659,956, filed Sep. 11, 2003, now U.S. Pat. No. 7,150,521 issued Dec. 19, 2006, the entire contents of each of which are incorporated herein by reference.

BACKGROUND OF THE INVENTION

1. Technical Field

This disclosure relates to a liquid jet head used for a liquid jet recording apparatus and, more particularly, to a liquid jet head using recording liquid with fine particles dispersed therein, a liquid jet recording apparatus for the liquid jet head, and a recording liquid (ink) used for the liquid jet head.

2. Description of the Related Art

Non-impact recording methods have recently gained attention since the noise created from the methods during recording is so little that the noise is almost unnoticeable. Among such methods, the so-culled inkjet recording method is known as an effective recording method which records with high speed and requires no special fixing process when recording to plain paper. Various types of inkjet recording methods have been proposed and improved. Some have been introduced to the market as actual products, while others are still being developed for practical use.

The inkjet recording method records by ejecting droplets of recording liquid (so-called ink) onto a recording medium. Various types of inkjet recording methods are described below. The various types of inkjet recording methods can be classified according to methods for creating the droplets, or methods for controlling the flight direction of the droplets.

In the prior art, for example in U.S. Pat. No. 3,060,429, a Tele-type method, which is an electrostatic attraction type method, is known as a method that creates droplets of ink by electrostatic attraction, controls the droplets by controlling an electric field according to recording signals, and allows the droplets to selectively adhere to a recording medium, to thereby achieve recording.

Furthermore, U.S. Pat. Nos. 3,596,275 and 3,298,030) disclose a Sweet type method which is a continuous stream and charge-controlled type method. The method creates droplets of recording liquid having electric charges thereof controlled by a continuous vibration method, and allows the electrically charged controlled droplets of the recording liquid to fly between deflection-electrodes applied with a uniform electric field, to thereby record to a recording medium.

As for another example, U.S. Pat. No. 3,416,153 discloses a Hertz type method which applies an electric field to a discharge port and a ring-like electrode, and creates a mist of droplets of recording liquid with use of a continuous vibration method, to thereby provide a recording image on a recording medium. That is, the strength of the electric field applied between the discharge port and the electrode is modulated according to recording signals, to thereby create a gradation in the recording image.

Furthermore, as another method, for example, U.S. Pat. No. 3,747,120 discloses a Stemme type method. This method is based on a principle different from those of the above-described three types. That is, all of the above-described three types employ electrical control of droplets ejected from a discharge port during their flight from the discharge port to thereby allow the droplets corresponding to the recording signals to selectively adhere to a recording medium. Meanwhile, the Stemme type is a method which ejects droplets of recording liquid only when requested in accordance with recording signals. That is, in recording with the Stemme type, electric recording signals are applied to a piezo vibration element provided to a recording head having a discharge port for discharging recording liquid, and the electric recording signals are changed to mechanical vibration of the piezo vibration element, to thereby allow droplets of recording liquid to eject from the discharge port in accordance with the mechanical vibration, and adhere to a recording medium. This type is referred as a “drop on demand type”.

Furthermore, Japanese Patent Publication No. 56-9429 discloses another type which is a type previously proposed by the applicant of the present invention. This type is also a “drop on demand type” which records by allowing droplets of recording liquid to eject from a discharge port according to recording signals. This type is a so-called “bubble inkjet type” which heats ink inside a liquid chamber, and creates bubbles inside the ink, to thereby allow a reaction of the bubbles to eject droplets of the ink from a discharge port.

As described above, many types of inkjet recording methods may be provided depending on the principle upon which the method is based. What is common with the inkjet recording methods is that the methods are performed by ejecting a recording liquid (so-called ink) and adhering the recording liquid to a recording medium. Furthermore, a recording liquid having a water-soluble dye dissolved therein is typically employed as a recording liquid (so-called ink). Recently, however, water-fastness and light-fastness of the ink are becoming more important. Therefore, a pigment having durable properties is anticipated to be used as a colorant of a recording liquid for inkjet recording.

For example, Japanese Patent Laid-open Application No. 2-255875 discloses a water-soluble pigment based ink for inkjet recording which fulfills basic requirements such as printing quality, ejection property, storage stability, and fixation.

However, unlike a dye-based ink in which dye can stably dissolve in a liquid medium, this pigment-based ink does not dissolve, but rather has particles thereof dispersed inside a liquid medium. Accordingly, this pigment-based ink has a disadvantage of instability in a liquid medium, and has yet to resolve problems such as pigment aggregation, sedimentation, and separation of the pigment in the ink, or clogging at a nozzle portion.

Meanwhile, a conventional discharge port (nozzle) of a recording head has an orifice typically ranging from Φ33 μm-Φ34 μm (approximately 900 $\mu m^2$ in terms of area of a nozzle orifice) to Φ50 μm-Φ51 μm (approximately 2000 $\mu m^2$ in terms of area of a nozzle orifice). However, owing to the recent advances in image quality and precision of inkjet recording, a recording head with a smaller discharge port is desired. In such a case, clogging would be no problem if a conventional water-soluble dye was employed as a recording liquid since the dye dissolves in a liquid medium. In contrast, clogging heretofore has been a grave problem for a pigment-based ink where a smaller discharge port is used (for example, an orifice no more than Φ25 μm).

Furthermore, since a water-soluble dye-based ink allows dye to dissolve in a liquid medium, droplets of the ink are able to penetrate fibers of a paper serving as a recording medium when the ink contacts and adheres to the paper, and thereby achieve satisfactory pixel formation/image formation. In contrast, with the recording liquid having pigment particles dispersed therein, the pigment particles, unlike dye, does not dissolve, but merely disperses in a liquid medium. Therefore, although the liquid medium of the ink may penetrate into fibers of a paper, pigment particles and solid content in the ink are unable to penetrate the fibers of the paper. Accordingly, color pixels are formed in a manner where particles and solid content of the ink are accumulated on the surface of the paper.

Therefore, a suitable pixel shape cannot be obtained unless the size of the pigment particles is optimized. For example, satisfactory round pixels would be difficult to obtain and high quality printing cannot be achieved if ink (recording liquid) which contains pigment particles with an order of magnitude equal to that of pixels to be formed on paper is used in forming the pixels.

SUMMARY

In an aspect of this disclosure, there is provided a liquid jet head which includes a nozzle element having nozzles from which a recording liquid is ejected to a recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the fine particles of the pigment are smaller than fibers of the recording medium, wherein the fine particles of the pigment are smaller than spaces between the fibers of the recording medium. Thereby, clogging of nozzles can be prevented, colorant can satisfactorily adhere to a recording medium, and pixels can be formed with excellent shape so that high quality recording can be achieved.

In another aspect of this disclosure, there is provided a liquid jet head including: a nozzle element having nozzles from which a recording liquid is ejected to a recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of die recording liquid stops changing when 100 ms or less elapses after the recording liquid contact-S the recording medium, wherein the recording medium has a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented, colorant can satisfactorily adhere to a recording medium, and pixels can be formed with excellent shape so that high quality recording can be achieved.

In another aspect of this disclosure, there is provided a liquid jet head including: a nozzle element having nozzles from which a recording liquid is ejected to a recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the recording medium is a resin material having a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented, colorant can satisfactorily adhere to a recording medium, and pixels can be formed with excellent shape so that high quality recording can be achieved.

In the liquid jet head of the present invention, the fine particles of the pigment may be dispersed in the recording liquid by including a dispersant in the recording liquid.

In the liquid jet head of the present invention, the fine particles of the pigment may be dispersed in the recording liquid by surface processing the fine particles of the pigment.

In the liquid jet head of the present invention, the fine particles of the pigment contained in the recording liquid may range from 2% to 10% by weight, wherein a solid content of the recording liquid including the fine particles of the pigment contained in the recording liquid may be no more than 15% by weight. Thereby, clogging of nozzles can be prevented.

The liquid jet head of the present invention may further include one or more other nozzle heads respectively having nozzles from which one or more other recording liquids are ejected to the recording medium. Thereby, the liquid jet head of the present invention can be used for color recording.

In the liquid jet head of the present invention, the one or more other recording heads may be formed integrally to thereby form a head unit. Thereby, the liquid jet head of the present invention can be compactly formed for performing color recording.

In the liquid jet head of the present invention, the head unit may have a recording head portion and a recording liquid container portion, wherein the recording head portion and the recording liquid container portion may be integrally formed. Thereby, color recording can be performed reliably.

In the liquid jet head of the present invention, the head unit may have a recording head portion and a recording liquid container portion, wherein the recording liquid container portion may be detachably attached to the recording head portion. Thereby, running cost in using the liquid jet head of the present invention for color recording can be reduced.

In the liquid jet head of the present invention, the recording liquid container portion may be detachable according to type of the one or more other recording liquids. Thereby, running cost in using the liquid jet head of the present invention for color recording can further be reduced.

In the liquid jet head of the present invention, the liquid jet head may employ a thermal liquid jet method which uses heat for ejecting recording liquid therefrom. Thereby, the liquid jet head of the present invention can further be compactly formed, and manufacture cost thereof can further be reduced.

In another aspect of this disclosure, there is provided a liquid jet recording apparatus including: a liquid jet head including a nozzle element having nozzles from which a recording liquid is ejected to a recording medium; a carriage mounting the liquid jet head; a guiding rod guiding the carriage; a conveying roller conveying the recording medium; a holding roller holding the recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the fine particles of the pigment are smaller than fibers of the recording medium, wherein the fine particles of the pigment are smaller than spaces between the fibers of the recording medium. Thereby, clogging of nozzles can be prevented, colorant can satisfactorily adhere to a recording medium, and pixels can be formed with excellent shape so that high quality recording can be achieved.

In another aspect of this disclosure, there is provided a liquid jet recording apparatus including: a liquid jet head including a nozzle element having nozzles from which a recording liquid is ejected to a recording medium, a carriage mounting the liquid jet head; a guiding rod guiding the carriage; a conveying roller conveying the recording medium; a holding roller holding the recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the recording medium has a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented colorant can satisfactorily adhere to a recording medium, and pixels can be formed with excellent shape so that high quality recording can be achieved.

In another aspect of this disclosure, there is provided a liquid jet recording apparatus including: a liquid jet head including a nozzle element having nozzles from which a recording liquid is ejected to a recording medium, a carriage mounting the liquid jet head; a guiding rod guiding the carriage; a conveying roller conveying the recording medium; a holding roller holding the recording medium, wherein the recording liquid contains fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the recording medium is a resin material having a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented, colorant can satisfactorily adhere to a recording medium, and pixels can be formed with excellent shape so that high quality recording can be achieved.

In the liquid jet recording apparatus of the present invention, the fine particles of the pigment may be dispersed in the recording liquid by including a dispersant in the recording liquid.

In the liquid jet recording apparatus of the present invention, the fine particles of the pigment may be dispersed in the recording liquid by surface processing the fine particles of the pigment.

In the liquid jet recording apparatus of the present invention, the fine particles of the pigment contained in the recording liquid may range from 2% to 10% by weight, wherein a solid content of the recording liquid including the fine particles of the pigment contained in the recording liquid may be no more than 15% by weight. Thereby, clogging of nozzles can be prevented.

In another aspect of this disclosure, there is provided a recording liquid used in a liquid jet head including a nozzle element having nozzles from which the recording liquid is ejected to a recording medium, in which the recording liquid includes: fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the fine particles of the pigment are smaller than fibers of the recording medium, wherein the fine particles of the pigment are smaller than spaces between the fibers of the recording medium. Thereby, clogging of nozzles can be prevented, colorant can satisfactorily adhere to a recording medium, and pixels can be formed with excellent shape so that high quality recording can be achieved.

In another aspect of this disclosure, there is provided a recording liquid used in a liquid jet head including a nozzle element having nozzles from which the recording liquid is ejected to a recording medium, in which the recording liquid includes: fine particles of a pigment, wherein the fine particles of the pigment contained in the recording liquid are no less than 1% by weight, wherein each of the nozzles has an area less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the recording medium has a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented, colorant can satisfactorily adhere to a recording medium, and pixels can be formed with excellent shape so that high quality recording can be achieved.

In another aspect of this disclosure, there is provided a recording liquid used in a liquid jet head including a nozzle element having nozzles from which the recording liquid is ejected to a recording medium, in which the recording liquid includes: fine particles of a pigment, wherein the fine particles of the pigment contained in the recording liquid are no less than 1% by weight, wherein each of the nozzles has an area that is less than 500 $\mu m^2$, wherein each of the fine particles of the pigment has a diameter satisfying a relation of $0.0005 \leqq Dp/Do \leqq 0.02$, wherein "Dp" represents the diameter of each of the fine particles of the pigment and "Do" represents a size of each of the nozzles, wherein when the nozzle element ejects the recording liquid onto the recording medium, a contact angle of the recording liquid stops changing when 100 ms or less elapses after the recording liquid contacts the recording medium, wherein the recording medium is a resin material having a surface coated with a coating material, wherein the fine particles of the pigment have an average diameter that is equal to or less than an average diameter of particles forming the coating material, wherein the average diameter of the fine particles of the pigment is smaller than smoothness of the coated surface of the recording medium. Thereby, clogging of nozzles can be prevented, colorant can satisfactorily adhere to a recording medium, and pixels can be formed with excellent shape so that high quality recording can be achieved.

In the recording liquid of the present invention, the fine particles of the pigment may be dispersed in the recording liquid by including a dispersant in the recording liquid.

In the recording liquid of the present invention, the fine particles of the pigment may be dispersed in the recording liquid by surface processing the fine particles of the pigment.

In the recording liquid of the present invention, the fine particles of the pigment contained in the recording liquid may range from 2% to 10% by weight, wherein a solid content of the recording liquid including the fine particles of the pigment contained in the recording liquid may be no more than 15% by weight. Thereby, clogging of nozzles can be prevented.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First, a liquid (ink) jet structure and mechanism according to an exemplary embodiment of the present invention will be described. Among the various inkjet (liquid jet) recording methods, a bubble inkjet method (thermal liquid jet method) is hereinafter described as a representative example of the ink jet recording methods. It will be appreciated, however, that the present invention is not limited to the bubble inkjet method, and that other types of inkjet recording methods may be employed for the present invention. Among the various types of inkjet recording methods, the bubble inkjet method, which creates gas bubbles by heating ink, is subject to harsher technological problems (e.g. clogging) compared to other types of ink jet recording methods. This is due to the fact that the ink of the bubble inkjet is subject to more severe conditions (e.g. this method includes an ink heating cycle), which leads to deterioration of ink, promotion of chemical reaction, and dispersion instability of pigment in the ink. The present invention, however, can be preferably applied to the bubble inkjet type recording method even under such severe conditions.

Figure 1A:
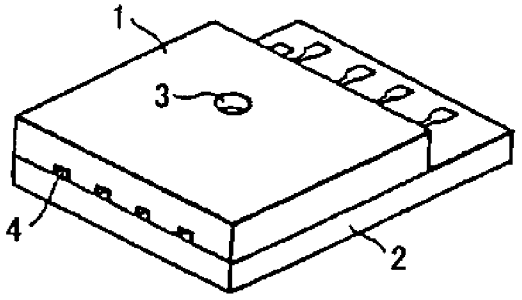
FIGS. 1A to 1D are views for describing an example of a bubble liquid jet type recording head.
Figure 1B:
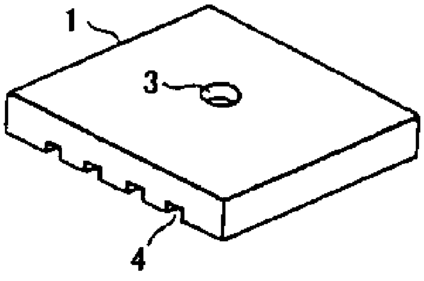
Figure 1C:
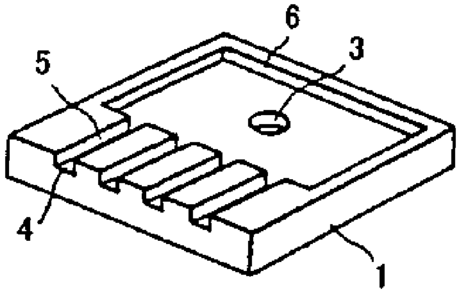
Figure 1D:
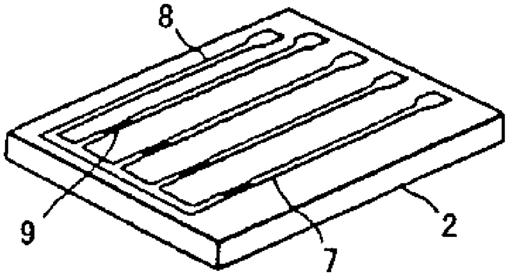

FIGS. 1A to 1D are views for explaining an example of a bubble inkjet type recording head (liquid jet head) according to the present invention, in which FIG. 1A is a perspective view of the recording head (liquid jet head), FIG. 1B is a perspective view of a cover substrate, FIG. 1C is a perspective view of the cover substrate observed from a back side, and FIG. 1D is a perspective view of a heating element substrate. In the drawings, numeral 1 indicates the cover substrate, numeral 2 indicates the heating element substrate, numeral 3 indicates an inlet for a recording liquid (ink), numeral 4 indicates a discharge port (nozzle), numeral 5 indicates a flow path, numeral 6 indicates a space for forming a liquid chamber, numeral 7 indicates a separate (independent) control electrode, numeral 8 indicates a common electrode, and numeral 9 indicates a heating element.

It is to be noted that, for example, a method of etching a glass substrate or a metal substrate may be employed for manufacturing the cover substrate 1. It is, however, most preferable to employ a plastic molding method. Although a cost of manufacturing an initial mold of the cover substrate 1 may be expensive, the cover substrate 1 can be subsequently produced in mass numbers, thereby reducing the manufacturing cost for forming a single unit of the cover substrate 1.

Figure 2A:
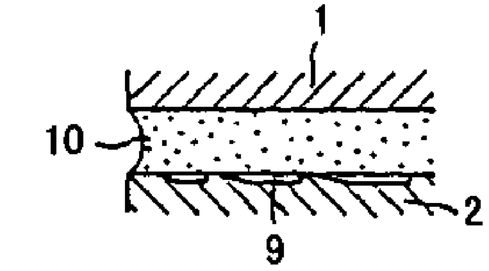
FIGS. 2A to 2G are views for describing a principle of ejecting droplets of ink by employing a bubble liquid jet type recording head.
Figure 2B:
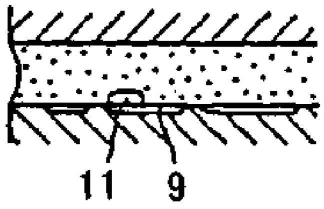

FIGS. 2A to 2G are views for describing a principle of ejecting ink droplets with a bubble inkjet type inkjet recording method. FIG. 2A shows an equilibrium state between a surface tension of an ink (recording liquid) 10 and an external pressure at a surface of the discharge port 4. In FIG. 2B, the heating element 9 is heated for rapidly increasing a surface temperature of the heating element 9 until a boiling effect is created at a neighboring ink layer, to thereby create a bubble 11 of minute size.

Figure 2C:
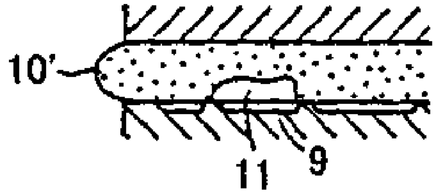

The neighboring ink layer which is rapidly heated is instantly vaporized, thereby creating a boiling film and forming the bubble 11 into a grown state, as shown in FIG. 2C. During this state, pressure inside the discharge port 4 increases in correspondence to the growth of the bubble 11, to thereby cause a non-equilibrium state between the surface tension of the ink and the external pressure at the surface of the discharge port 4. Then, an ink column 10' begins to grow outward from the discharge port 4.

Figure 2D:
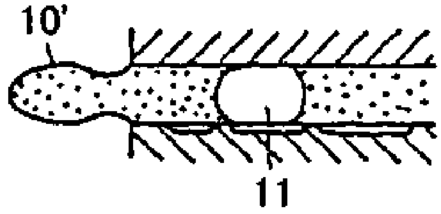

FIG. 2D shows the bubble 11 in a maximum grown state, in which ink having a volume equal to that of the bubble 11 is forced out from the surface of the discharge port 4. Since no electric current is supplied to the heating element 9 during this state, the temperature at the surface of the heating element 9 begins to decrease. An occurrence of the maximum bubble volume may slightly delays from a time for applying electric pulse.

Figure 2E:
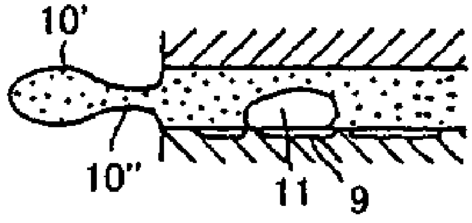

The bubble 11 being cooled by the ink 10 begins to contract as in a state shown in FIG. 2E. While a distal end portion of the ink column 10' continues to advance maintaining an initial emission velocity, the ink 10 flows backwards from the surface of the discharge port 4 and into the discharge port 4 as the internal pressure at the discharge port 4 decreases in correspondence to the contraction of the bubble 11, to thereby form a constriction 10" at a proximal end portion of the ink column 10'.

Figure 2F:
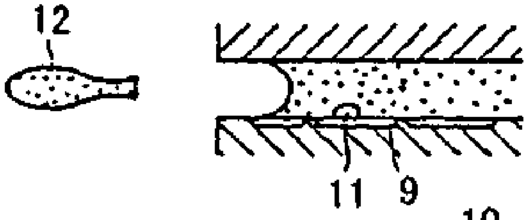

FIG. 2F shows a state where the bubble 11 is continuing to contract, and the surface of the heating element 9 is being further being rapidly cooled by the surrounding ink 10. At the surface of the discharge port 4' meniscus deeply penetrates into the discharge port 4 since the external pressure is higher than the internal pressure at the discharge port 4. The distal end portion of the ink column 10' becomes a droplet 12 which flies to a direction of a recording medium (paper) at a speed of 8-15 m/s.

Figure 2G:
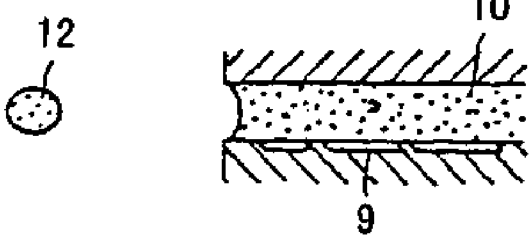

In FIG. 2G, ink is supplied (refilled) again into the discharge port 4 with a capillary-like action, and the bubble 11 completely disappears as the discharge port 4 returns to the state of FIG. 2A.

Figure 3A:
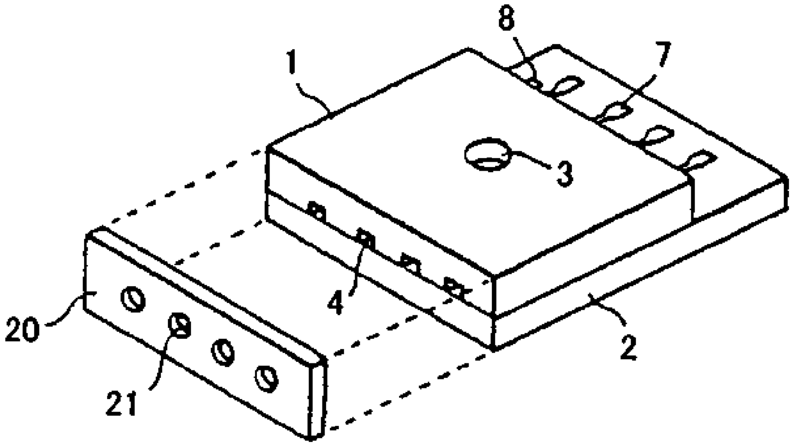
FIGS. 3A and 3B are views showing a liquid jet head having a nozzle plate.
Figure 3B:
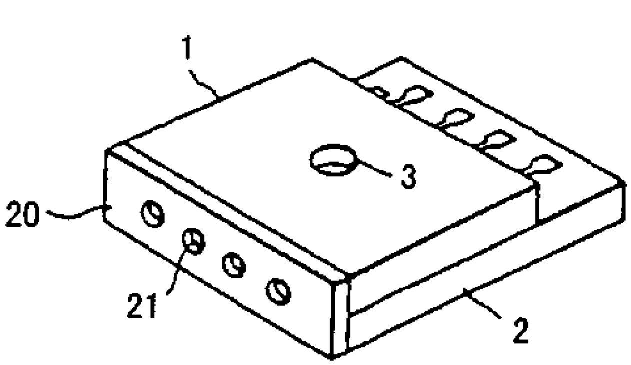

FIGS. 3A and 3B show another recording head (liquid jet head) having a nozzle plate 20 arranged separately at a flow path at a distal end portion thereof, unlike the inkjet head of FIG. 1. FIG. 3A shows a state prior to attaching the nozzle plate 20, and FIG. 3B shows a state after attaching the nozzle plate 20. In this case also, the nozzle plate 20 may be a resin (plastic) film where nozzles 21 are formed thereto by perforating with an excimer laser, or by employing processing methods such as metal etching, electro-forming, or punching.

Although a general structure and principle of an exemplary bubble inkjet type inkjet head using heat (thermal liquid jet method) have been described above, the present invention is not to be limited to such principle. Any type of inkjet recording method may be employed for the present invention, for example, a bubble inkjet type where droplets are ejected without contraction of bubbles, or other inkjet types besides bubble inkjet types (e.g. piezo type) may also be employed.

A pigment which has an excellent water-fastness and light-fastness is employed as a colorant for a recording liquid (ink) according to an embodiment of the present invention. Although there are pigments which are organic and inorganic, neither of such pigments dissolves in a liquid solvent, in contrast to a dye which is able to dissolve in a liquid solvent. Furthermore, a weight ratio of an inorganic pigment in ink ranges from 1.7 to 9.1, and a weight ratio of an organic pigment in ink (which is typically lower than the inorganic pigment) ranges from 1.36 to 2.61. Nevertheless, both pigments have weight ratios greater than that of a liquid solvent (e.g. water) of an ink (substantially 1) and, therefore, are liable to cause undesired ink related inkjet problems such as pigment sedimentation and/or aggregation.

That is, although there are beneficial aspects in using a pigment as a colorant of a recording liquid, there are still unresolved disadvantages (such as instability of a pigment in a liquid medium, pigment aggregation, pigment sedimentation, pigment separation, and clogging at a nozzle portion) since the pigment has a weight ratio greater than 1 and thus a weight ratio greater than that of a liquid solvent (substantially 1). Clogging at a nozzle portion is particularly a crucial problem for ink jetting as ink then cannot be ejected.

The present invention serving to solve the foregoing problems, is based on consideration given to, for example, materials used for the ink, a structure of a nozzle portion, pigment particle diameter, and amount of pigment contained in ink. In an embodiment of the present invention, the ink used is a pigment-based ink. The colorant inside the recording liquid for such embodiment of the present invention is not a dye which dissolves in a solvent such as water, but is a pigment having fine particles dispersed therein.

Furthermore, in a case of using a recording liquid with a water-soluble dye dissolved therein, the recording liquid is able to penetrate into the fibers of a paper upon contacting and adhering to the paper. In a case of using a recording liquid using pigment as a colorant, other than a liquid medium of the recording liquid, pigment particles and solid content of the recording liquid are unable to penetrate the fibers of the paper. Therefore, color pixels form in a manner by which the particles and the solid material of the pigment accumulate on the surface of the paper. Accordingly, a suitable pixel shape cannot be obtained unless the size of the pigment particle is optimized. The present invention solves this problem based on extensive experiments on a relation between the surface characteristics of paper (recording medium) and the pigment particle diameter.

A black pigment-based ink preferably used in the present invention may be, for example, a black pigment with a neutral or basic pH which is dispersed by using a water soluble polymer comprising at least tertiary amine salt, acrylate monomer with quaternary ammonium group, or acrylamide monomer. Furthermore, in terms of other ink colors (e.g. yellow ink, magenta ink, cyan ink), a pigment corresponding to the respective colors is dispersed by using an anion based polymer dispersant having carboxyl group or sulfone group as a water soluble group.

In this context, pH of a black pigment-based ink refers to a pH of a solvent in a case where a pigment is dispersed in pure water in a way similar to measuring the physical property of carbon black. In a case where the recording medium is plain paper, it is preferable for the black pigment-based ink to have an interfacial tension higher than that of the color inks. Furthermore, in such case, it is also preferable for the black pigment-based ink to have a penetration rate lower than that of the color ink.

Thus, according to the invention, a high quality image with excellent fixability, good color density, and little color bleeding between black and other colors can be obtained when color recording by use of an ink with optimized pigment particle diameter and wettability with respect to paper (recording medium). In addition, owing to the fact that the ink according to an embodiment of the present invention is a pigment based ink, it will be appreciated that superb light-fastness and water-fastness can be obtained compared to, for example, a conventional dye based ink.

The polymer dispersant employed in the present invention is mainly a dispersant obtained by polymerization of vinyl monomer, in which a cationic monomer contained in the resultant polymer (at least in a portion thereof) is, for example, a tertiary amine salt or a quaternary compound thereof.

Examples of such vinyl monomers include N,N-dimethylaminoethylmethacrylate ($CH_2{=}C(CH_3){-}COO{-}C_2H_4N(CH_3)_2$), N,N-dimethylaminoethylacrylate ($CH_2{=}CH{-}COO{-}C_2H_4N(CH_3)_2$), N,N-dimethylaminopropylmethacrylate ($CH_2{=}C(CH_3){-}COO{-}C_3H_6N(CH_3)_2$), N,N-dimethylaminopropylacrylate ($CH_2{=}CH{-}COO{-}C_3H_6N(CH_3)_2$), N,N-dimethylacrylamide ($CH_2{=}CH{-}CON(CH_3)_2$), N,N-dimethylmethacrylamide ($CH_2{=}C(CH_3){-}CON(CH_3)_2$), N,N-dimethylaminoethylacrylamide ($CH_2{=}CH{-}CONHC_2H_4N(CH_3)_2$), N,N-dimethylaminoethylmethacrylamide ($CH_2{=}C(CH_3){-}CONHC_2H_4N(CH_3)_2$), N,N-dimethylaminopropylacrylamide ($CH_2{=}CH{-}CONH{-}C_3H_6N(CH_3)_2$), and N,N-dimethylaminopropylmethacrylamide ($CH_2{=}C(CH_3){-}CONH{-}C_3H_6N(CH_3)_2$).

Compounds forming a salt of the tertiary amine include, for example, hydrochloric acid, sulfuric acid, and acetic acid. As for compounds employed for quaternization, there are, for example, methyl chloride, dimethylsulfuric acid, benzyl chloride, and epichlorohydrin. Among the compounds, methyl chloride and dimethylsulfuric acid are preferable for preparing the dispersant. The salt derived from the tertiary amine or the quaternary ammonium compound is dissolved in a solvent so as to release cation in the solvent. As the solvent containing the cation is neutralized, the solvent should be acidic. The percentage of the monomers contained in the copolymer preferably ranges from 20% to 60% by weight.

As for other monomers included in the polymer dispersant, there are, for example, 2-hydroxyethylmethacrylate, acrylate having a hydroxy group (e.g. acrylate having a long ethylene oxide chain as a side chain thereof), hydrophobic monomers (e.g. styrene, styrene derivative, vinylnaphthalene, vinylnaphthalene derivative, (meth)acrylic acid alkyl ester, acrylonitrile), monomers soluble in water with a pH of approximately 7 (e.g. acrylamide monomers, vinyl ether monomers, vinylpyrrolidone monomers, vinylpyridine monomers, vinyloxazoline monomers). The water soluble monomer contained in the polymer dispersant obtained by copolymerization preferably ranges from 15% to 35% by weight in order to stably maintain the copolymer in the water solvent, and the hydrophobic monomer preferably ranges from 20% to 40% by weight for enhancing dispersibility of the copolymer with respect to the pigment.

As for the carbon black pigment (C.I. Pigment Black 7) used as black ink in the present invention, there are, for example: #2600, #2300, #990, #980, #960, #950, #900, #850, #750, #650, MCF-88, MA-600, #95, #55, #52, #47, #45, #45L, #44, #40, #33, #32, #30, #25, #20, #10, #5 (manufactured by Mitsubishi Chemical Corp.); Printex 95, Printex 90, Printex 85, Printex 80, Printex 75, Printex 45, Printex 40, Printex P, Printex 60, Printex 300, Printex 30, Printex 35, Printex 25, Printex 20, Printex A, Printex G, Printex L6, Printex L (manufactured by Degussa AG); Raven 850, Raven 780 ULTRA, Raven 760 ULTRA, Raven 790 ULTRA, Raven 520, Raven 500, Raven 410, Raven 420, Raven 430, Raven 450, Raven 460, Raven 890, Raven 1020 (manufactured by Columbian Chemicals Company); Regal 415R, Regal 1330R, Regal 250R, Regal 995R, Monarch 800, Monarch 880, Monarch 900, Monarch 460, Monarch 280, and Monarch 120 (manufactured by Cabot Corporation).

The pigment used as yellow ink in the present invention include, for example, C.I. pigment yellow 1, C.I. pigment yellow 2, C.I. pigment yellow 3, C.I. pigment yellow 12, C.I. pigment yellow 13, C.I. pigment yellow 14, C.I. pigment yellow 16, C.I. pigment yellow 17, C.I. pigment yellow 73, C.I. pigment yellow 74, C.I. pigment yellow 75, C.I. pigment yellow 83, C.I. pigment yellow 93, C.I. pigment yellow 95, C.I. pigment yellow 97, C.I. pigment yellow 98, C.I. pigment yellow 114, C.I. pigment yellow 128, C.I. pigment yellow 129, C.I. pigment yellow 151, and C.I. pigment yellow 154.

The pigment used as magenta ink in the present invention include, for example, C.I. pigment red 5, C.I. pigment red 7, C.I. pigment red 12, C.I. pigment red 48 (Ca), C.I. pigment red 48 (Mn), C.I. pigment red 57 (Ca), C.I. pigment red 57:1, C.I. pigment red 112, C.I. pigment red 123, C.I. pigment red 168, C.I. pigment red 184, and C.I. pigment red 202.

The pigment used as cyan ink in the present invention include, for example, C.I. pigment blue 1, C.I. pigment blue 2, C.I. pigment blue 3, C.I. pigment blue 15:3, C.I. pigment blue 15:34, C.I. pigment blue 16, C.I. pigment blue 22, C.I. pigment blue 60, C.I. vat blue 4, and C.I. vat blue 60.

In a case where middle (intermediate) colors are required, the following pigments may be employed independently or in combination. The pigments include, for example, C.I. pigment red 209, C.I. pigment red 122, C.I. pigment red 224, C.I. pigment red 177, C.I. pigment red 194, C.I. pigment orange 43, C.I. vat violet 3, C.I. pigment violet 19, C.I. pigment green 36, C.I. pigment green 7, C.I. pigment violet 23, C.I. pigment violet 37, C.I. pigment blue 15:6, and C.I. pigment blue 209.

Furthermore, the following dyes may be contained in the above-given color inks of the present invention.

The dye used for the yellow ink include, for example, C.I. acid yellow 11, C.I. acid yellow 17, C.I. acid yellow 23 C.I. acid yellow 25, C.I. acid yellow 29, C.I. acid yellow 42, C.I. acid yellow 49, C.I. acid yellow 61, C.I. acid yellow 71, C.I. direct yellow 12, C.I. direct yellow 24, C.I. direct yellow 26, C.I. direct yellow 44, C.I. direct yellow 86, C.I. direct yellow 87, C.I. direct yellow 98, C.I. direct yellow 100, C.I. direct yellow 130, and C.I. direct yellow 142.

The dye used for the magenta ink include, for example, C.I. acid red 1, C.I. acid red 6, C.I. acid red 8, C.I. acid red 32, C.I. acid red 35, C.I. acid red 37, C.I. acid red 51, C.I. acid red 52, C.I. acid red 80, C.I. acid red 85, C.I. acid red 87, C.I. acid red 92, C.I. acid red 94, C.I. acid red 115, C.I. acid red 180, C.I. acid red 254, C.I. acid red 256, C.I. acid red 289, C.I. acid red 315, C.I. acid red 317, C.I. direct red 1, C.I. direct red 4, C.I. direct red 13, C.I. direct red 17, C.I. direct red 23, C.I. direct red 28, C.I. direct red 31, C.I. direct red 62, C.I. direct red 79, C.I. direct red 81, C.I. direct red 83, C.I. direct red 89, C.I. direct red 227, C.I. direct red 240, C.I. direct red 242, and C.I. direct red 243.

The dye used for the cyan ink include, for example, C.I. acid blue 9, C.I. acid blue 22, C.I. acid blue 40, C.I. acid blue 59, C.I. acid blue 93, C.I. acid blue 102, C.I. acid blue 104, C.I. acid blue 113, C.I. acid blue 117, C.I. acid blue 120, C.I. acid blue 167, C.I. acid blue 229, C.I. acid blue 234, C.I. acid blue 254, C.I. direct blue 6, C.I. direct blue 22, C.I. direct blue 25, C.I. direct blue 71, C.I. direct blue 78, C.I. direct blue 86, C.I. direct blue 90, C.I. direct blue 106, and C.I. direct blue 199. Nevertheless, in the case of including the dyes in the color inks, pigment particle diameter and amount of pigment contained in the ink are required to be fall within a prescribed range (described below).

In the present invention where the cationic water soluble polymer is used as a dispersant for dispersing a pigment, a pigment having an isoelectric point no less than 6 is preferable. Furthermore, from an aspect of dispersibility, the pH of a pigment dispersed in pure water is preferably neutral or basic, for example, pH ranging from 7 to 10. This owes to a strong ionic interaction between the pigment and cationic water soluble polymer.

A pigment dispersion (ink) using the foregoing materials can be obtained with the following procedures.

(1) A case where carbon black is used:

First, carbon black is pre-mixed in a cationic dispersant, is then milled in a dispersing apparatus (mixer) at a high shear rate, is then diluted, and is subject to a centrifuge process for removing coarse particles therefrom. Then, additives are added according to the desired black ink. Furthermore, the carbon black may be subject to an aging process, if desired. Then, finally, the carbon black dispersion is subject to a centrifuge process to thereby obtain an ink having pigment particles formed with desired particle diameter. The pH of the ink should preferably range from 3 to 9.

(2) A case where a pigment of a color besides black is used:

Other than using an anionic dispersant, a pigment dispersion (ink) can be obtained by executing the same procedures as for carbon black. However, in a case of using an organic pigment, it is desired to apply surfactant to the pigment at immediately after preparation of the pigment or during preparation of the pigment to thereby inhibit crystal growth of pigment particles. A pigment which is processed to enhance wettability is preferably used. The pH of the ink should preferably range from 5 to 10.

The average particle diameter for the pigment of the present invention is to range from 0.005 μm to 2 μm in order to ensure dispersion stability regardless whether the ink is to be carbon black ink or color ink. It is to be noted that the preferable surface tension of the ink is to range from 10 dyn/cm to 60 dyn/cm.

Next, ink according to the present invention will be described from an aspect of recording the ink to a recording medium such as paper.

Typically, paper is manufactured by suspending plant fibers in water, filtering the water, and tangling the fibers into a flat and thin form. In other words, paper is an aggregation obtained by decomposing fibers of, for example, grass, trees, and bamboo. Whether the paper is Japanese paper or Western paper, cellulose fiber is used as a raw material of the paper. By processing the raw material with a unique sheet manufacturing technique and forming the raw material into a thin layer form, paper can be obtained.

A wood fiber (having a length of 1 mm to 3 mm, a width of 20 μm to 40 μm, a thickness of 3 μm to 6 μm) is used as a cellulose fiber for western paper, in which 10 to 100 of the fibers are overlapped to thereby form a typical western paper. The western paper, therefore, has considerable porosity and may be used as a smooth material with remarkable compatibility. A bast fiber, which is comparatively narrower than wood fiber, (having a length 3 mm to 7 mm, a width of 5 μm to 20 μm) is used as a cellulose fiber for Japanese paper, in which the Japanese paper can be classified into handmade Japanese paper and machine made Japanese paper.

Figure 4:
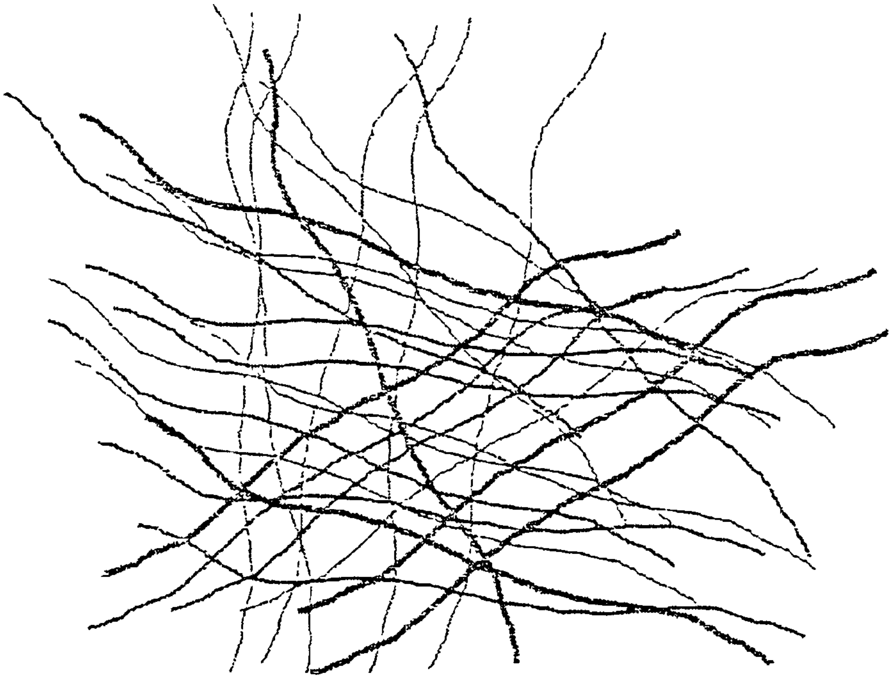
FIG. 4 is an enlarged view of a paper surface.

FIG. 4 is a diagram showing an exemplary paper surface, in which the lines illustrated in FIG. 4 indicate fibers of paper. As shown in FIG. 4, paper has cellulose fibers overlapping each other and spaces formed between the overlapping cellulose fibers. The paper described above refers to base paper where cellulose fibers are simply in an overlapped state. Meanwhile, paper for actual use is usually added with additive particles (e.g. talc, clay, calcium carbonate, titanium oxide with particle diameter of 0.2 μm to 10 μm) in spaces between the fibers. This enhances property, such as, opacity, brightness, smoothness, and air permeability.

Furthermore, depending on usage of paper, the paper may be applied with a coating liquid (coating material) having particles of kaolin ($Al_2O_3$.$2SiO_2$.$2H_2O$) calcium carbonate ($CaCO_3$), or satin white ($3CaO$.$Al_2O_3$. $3CaSO_4$.31-32$H_2O$) with particle diameters of approximately 0.5 μm to 1 μm dispersed therein together with a binder such as latex or starch.

Furthermore, a resin sheet such as a polyethylene film (e.g. OHP sheet) may also be applied with a coating liquid having particles of kaolin ($Al_2O_3$. $2SiO_2$.$2H_2O$), calcium carbonate ($CaCO_3$), or satin white ($3CaO$.$Al_2O_3$.$3CaSO_4$.31-32$H_2O$) with particle diameters of approximately 0.5 μm to 1 μm dispersed therein together with a binder such as latex or starch.

As for other types of paper, there is, for example, newsprint paper, non-coated printing paper (including high, medium and low grade printing paper, thin printing paper), light weight coated printing paper (including wood free paper), coated printing paper (art paper, coated paper), communication paper (copying paper, sensitizing paper, form paper, PPC paper, thermal paper), wrapping paper (kraft paper, simili paper), sanitary paper (tissue paper, toilet paper, tower paper), miscellaneous paper (base paper for building material, base paper for laminated plates, condenser paper, rice paper, glassine paper) and base paper for corrugated fiber-board (liner, corrugating medium).

In any case, from a microscopic view point, the surface of paper is formed with a concavo-convexo surface in accordance with factors such as thickness of cellulose fibers spaces formed between overlapping cellulose fibers, or particle diameter of the particles forming a coating where coated paper (recording medium) is used. The concavo-convexo surface is one of the sources which prevent high quality ink jet recording.

Conventionally, in terms of a recording liquid having a dye dissolved in a solvent (dye-based ink), high quality recording can be achieved by optimizing the relation between the dye-based ink and paper. This owes to the fact that dye-based ink allows the dye to permeate into the fibers of the paper together with the solvent when droplets of the dye-based ink contacts to the paper. Meanwhile, in terms of a recording liquid having a pigment dispersed in a solvent (pigment-based ink), only the solvent contained in the pigment-based ink is able to permeate into the fibers of the paper. The manner in which the relation of pigment dispersed in a pigment-based ink and paper should be optimized has heretofore not been found.

Accordingly, in the present invention, surface property of paper (recording medium) and the size of pigment particles are evaluated. As mentioned above, cellulose fibers generally have a thickness of approximately 5 μm to 40 μm depending on the type of paper. However, the fibers of the papers for actual use are thinner since papers are generally subject to a process referred as beating (or refining) in a manufacture process in which mechanical force is applied to the fibers of the papers. Accordingly, the fibers of the papers which have been applied with the beating process generally have a thickness of approximately 3 μm to 6 μm, for example.

In the present invention, the size of the pigment particles, for example, may be a factor considered for suitably adhering the pigment particles to the surface of the papers and suitably forming round pixels of ink thereon. For example, in a case where pigments or pigment aggregates are larger than overlapping fibers of paper or spaces formed between the fibers (see FIG. 5), the ink comprising the pigments or the pigment aggregates cannot form round pixels upon contacting to the paper. In addition, since the pigments and the pigment aggregates are unable to permeate through the spaces formed between the overlapped fibers, the ink are unable to stably adhere to the paper.

Figure 5:
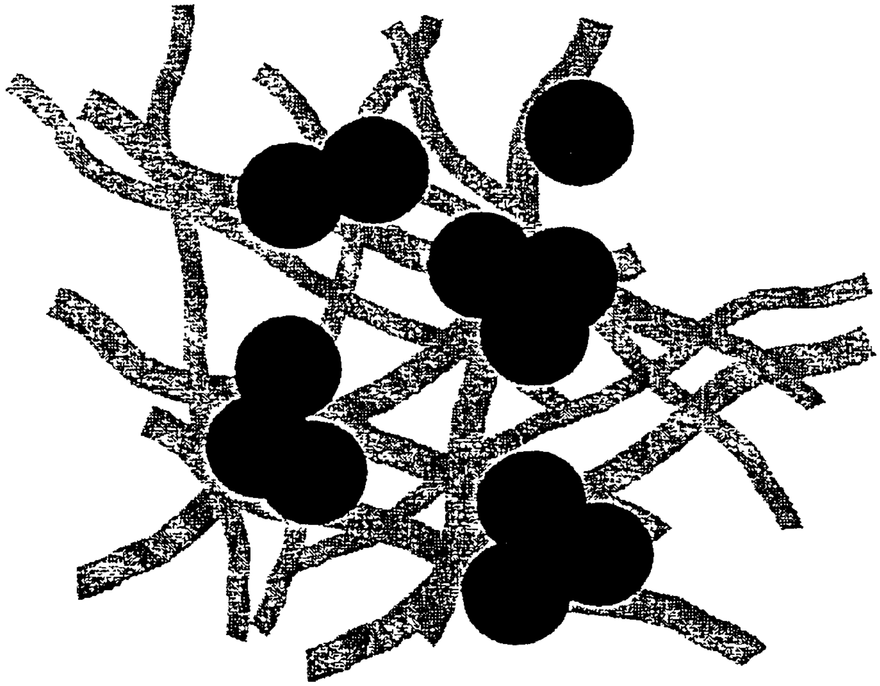
FIG. 5 is a view showing an image where pigment particles with a large particle diameter are adhered to a paper surface.
Figure 6:
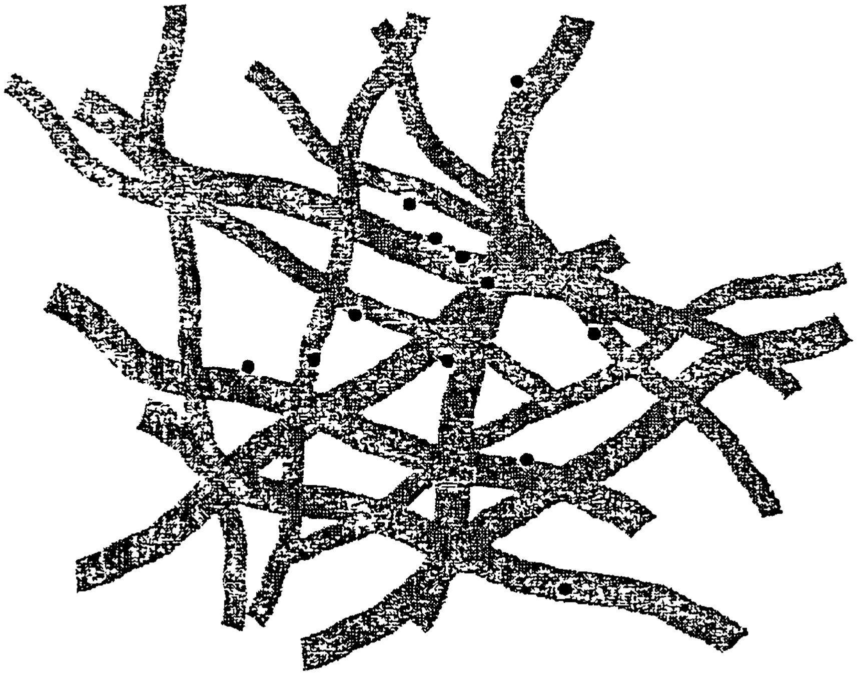
FIG. 6 is a view showing an image where pigment particles having a particle diameter smaller than fibers of paper are adhered to a paper surface.

Meanwhile, the present invention, however, has pigment particles dispersed in a solvent in which the sizes of the pigment particles are smaller than the thickness of the fibers of paper (in this embodiment, after the beating process) as well as spaces formed between the fibers (see FIG. 6). It is to be noted that FIG. 5 and FIG. 6 are enlarged to a greater degree compared to FIG. 4.

In a case where a coated paper (coated recording medium) is used, besides the fibers of paper which form a concavo-convexo surface on the paper (recording medium), particle size of particles forming the coating of the coated paper has a large influence on surface property of paper. Therefore, in a case where the coated paper is used, size of the particles forming the coating of the coated paper has a largely affect the formation of optimum pixels on paper.

An experiment was performed on the formation of pixels by using papers having various surface properties and ink comprising pigments with particles of various particle diameters.

The recording head used in the experiment is an inkjet recording head similar to that shown in FIG. 1. In the recording head shown in FIG. 1, the end portions of the flow paths 5 serve as the discharge ports 4 of the recording head. However, the inkjet recording head used in the experiment additionally has a nozzle plate 20 formed of nozzles 21 arranged to provide a density (dpi) same as that of flow path 5 of the recording head shown in FIG. 1. FIG. 3A is a perspective view showing the recording head used in the experiment where the nozzle plate 20 is not yet attached thereto, and FIG. 3B is a perspective view showing the recording head used in the experiment where the nozzle plate 20 is attached thereto. FIGS. 1, 3A, and 3B are simplified diagrams showing the recording heads with merely four discharge ports (nozzles). Nevertheless, the number of discharge ports for the recording head actually used in the experiment is 256 ports, and the density of the recording head is 600 dpi. Furthermore, the orifice diameter of the discharge port (nozzles) of the recording head used in the experiment is ϕ20 μm (314 $μm^2$ in area).

In the experiment, the size of the heating element 9 was 20 μm×85 μm, the resistance thereof was 106Ω, the drive voltage for the ejection of ink was 23V, the drive pulse width was 6 μs, and the drive frequency was 12 kHz. The thickness of the nozzle plate 20 was 40 μm.

Ten kinds of ink comprising pigment particles with particle diameters ranging from 0.005 μm through 20 μm were used in the experiment.

The method of manufacturing the ink is described below. With the method, a carbon black dispersion was obtained by using a solvent which has a copolymer P formed of styrene/methacrylate acid/butylacrylate (acid value: 325, weight-average molecular weight: 11,000, glass transition temperature: 84° C.) dissolved with kalium. The carbon black dispersion was obtained with the following materials:

| | |
|---|---|
| aqueous solvent of copolymer P (solid content 20% by weight) | 40 parts |
| carbon black (MA-800 manufactured by Mitsubishi Chemical Corp.) | 25 parts |
| diethylene glycol | 20 parts |
| isopropyl alcohol | 10 parts |
| water | 130 parts. |

The materials were disposed into a batch-vertical type sand mill (manufactured by Aimex Co. Ltd.) having glass beads (1 mm diameter) serving as media thereof. Then, the materials in the mill were dispersed for three hours while being water-cooled. Thereby, a crude dispersion with a pH of 9.7 and a viscosity of 16 cP was obtained. Then, the dispersed liquid was subject to a centrifuge process for removing large crude particles therefrom. By altering the conditions for performing the centrifuge process, ten kinds of dispersions having pigment particles with average particle diameters ranging from 0.005 μm through 20 μm were obtained. Then, the dispersion was diluted with water to thereby obtain ten kinds of black basic inks having a viscosity of 2.4 cP, a surface tension of 46 dyn/cm, and a pH of 9.5. The solid content of the final inks was approximately 8% by weight. The final amount of pigment contained in the inks was 5% by weight. It is to be noted that the average particle diameters were measured by an electrophoretic light scattering photometer (ELS-800 manufactured by Otsuka Electronics Co. Ltd.). The average value was obtained from an initial gradient of auto-correlation function.

With the ten kinds of inks, the shapes of the formed pixels were graded by way of organoleptic testing. In this experiment: the ten kinds of ink were filled into the recording head shown in FIGS. 3A-3B; droplets of the ink were adhered on three different types of paper (uncoated paper types 1 and 2, and coated paper 1) and also on a resin material (polyethylene film); and dots having pixel diameter of approximately ϕ60 μm through ϕ 65 μm were formed. It is to be noted that ink with pigment particles of large diameter could hardly be evaluated since the recording head was clogged so fast that hardly any of the ink could be ejected from the recording head. In this experiment, inks were evaluated until nozzles became completely clogged.

Additive particles of clay (particle diameter of 10 μm) in an amount of 10% were added to the fibers of the three types of paper. It is to be noted that the value of the thickness of the fibers and the value of the size of the spaces formed between the overlapping fibers are average values obtained by observing the surface of the papers (recording media) with SEM (Scanning Electron Microscopy) and measuring the values from ten randomly extracted portions of the papers. The smoothness of the surface of the coated paper and the polyethylene film is measured with a stylus type surface roughness meter.

The results of the evaluation are shown in tables 1 through 4, in which the grades of the ten randomly extracted portions (represented with "○" and "X") are evaluated by way of organoleptic testing by looking at images magnified 100 times through the microscope.

TABLE 1

Uncoated Paper Type 1
Fiber Thickness→Ranging from 5 μm to 15 μm (paper not subject to beating process)
Spaces Formed Between Overlapping Fibers→Ranging from 1 μm to 3 μm

| No. | Pigment Particle Diameter Dp (μm) | Grade |
|---|---|---|
| 1 | 0.005 | ○ |
| 2 | 0.01 | ○ |
| 3 | 0.05 | ○ |
| 4 | 0.1 | ○ |
| 5 | 0.5 | ○ |
| 6 | 1 | ○ |
| 7 | 3 | ○ |
| 8 | 5 | X |
| 9 | 10 | X |
| 10 | 20 | X1) |

1)Ink ejection impossible

TABLE 2

Uncoated Paper Type 2
Fiber Thickness→Ranging from 3 μm to 6 μm (paper subject to beating process)
Spaces Formed Between Overlapping Fibers→Ranging from 1 μm to 2 μm

| No. | Pigment Particle Diameter Dp (μm) | Grade |
|---|---|---|
| 1 | 0.005 | ○ |
| 2 | 0.01 | ○ |
| 3 | 0.05 | ○ |
| 4 | 0.1 | ○ |
| 5 | 0.5 | ○ |
| 6 | 1 | ○ |
| 7 | 3 | X |
| 8 | 5 | X |
| 9 | 10 | X |
| 10 | 20 | X1) |

1)Ink ejection impossible

TABLE 3

Coated Paper
Coating Material→Calcium carbonate ($CaCO_3$) having particle diameter of 1 μm
Smoothness of Coated Surface→2s

| No. | Pigment Particle Diameter Dp (μm) | Grade |
|---|---|---|
| 1 | 0.005 | ○ |
| 2 | 0.01 | ○ |
| 3 | 0.05 | ○ |
| 4 | 0.1 | ○ |
| 5 | 0.5 | ○ |
| 6 | 1 | ○ |
| 7 | 3 | X |
| 8 | 5 | X |
| 9 | 10 | X |
| 10 | 20 | X1) |

1)Ink ejection impossible

TABLE 4

Polyethylene Film
Coating Material→Satin white ($3CaO \cdot Al_2O_3 \cdot 3CaSO_4 \cdot 31\text{-}32H_2O$) having particle diameter of 1 μm
Smoothness of Coated Surface→1.5s

| No. | Pigment Particle Diameter Dp (μm) | Grade |
|---|---|---|
| 1 | 0.005 | ○ |
| 2 | 0.01 | ○ |
| 3 | 0.05 | ○ |
| 4 | 0.1 | ○ |
| 5 | 0.5 | ○ |
| 6 | 1 | ○ |
| 7 | 3 | X |
| 8 | 5 | X |
| 9 | 10 | X |
| 10 | 20 | X1) |

1)Ink ejection impossible

The results of tables 1 and 2 show that satisfactory pixels can be obtained when the pigment particle diameter is smaller than the thickness of the fibers of the uncoated papers. The tables 1 and 2 also show that satisfactory pixels can be obtained when the pigment particle diameter is smaller than the spaces formed between the overlapping fibers of the uncoated papers.

The tables 3 and 4 show that satisfactory pixels can be obtained when the pigment particle diameter is equal to or less than the average particle diameters of the particles forming the coating of the coated paper or the polyethylene film. The tables 3 and 4 also show that satisfactory pixels can be obtained when the pigment particle diameter is smaller than the smoothness of the coating of the coated paper or the polyethylene film.

Next, the ink of the present invention will be evaluated from another aspect. Generally, ink which use pigment as a colorant is manufactured having particles with pigment particle diameters of 0.5 μm to 100 μm according to, for example, the purpose, the cost or the manufacturing method of the ink. In the present invention, the ink of the present invention requires the pigment particle diameter thereof to be formed into fine sizes so as to formed suitable pixels on the surface of the concavo-convexo surface of the recording medium and also to be suitably ejected by the ink jet head. However, the particles having fine particle diameter have a tendency to aggregate, and are not easily dispersed inside the solvent of the ink. Therefore, in the present invention, the pigment particles are dispersed in the solvent by being dispersed together with a dispersant or by surface processing the surface of the pigment particles.

The dispersant used in the embodiment of the present invention is an alkali soluble resin with a weight-average molecular weight ranging between 1,000 through 30,000 (more preferably, between 3,000 through 15,000). More particularly, the dispersant used in the present invention includes, for example, a copolymer comprising a hydrophobic monomer (e.g. styrene, styrene derivatives, vinylnaphthalene, vinylnaphthalene derivatives, acrylic acid alkyl ester, methacrylic acid alkyl ester) and a hydrophilic monomer (e.g. ethylene alpha beta-unsaturated carboxylic acid, aliphatic alcohol ester thereof, acrylic acid, methacrylic acid, maleic acid, itaconic acid, fumaric acid, and derivatives thereof) or a salt of the copolymer. The copolymer may be, for example, a random copolymer, a block copolymer, or a graft copolymer. The acid value of the copolymer may range from 100 to 430, and more preferably from 130 to 360.

As for other suitable dispersants of the present invention, there is, for example, a water-soluble polymer (e.g. polyvinyl alcohol, carboxymethylcellulose), and a water-soluble resin (e.g. condensated naphthalene sulfonic acid formaldehyde, polystyrene sulfonic acid). Nevertheless, the alkali-soluble water-soluble resin has an advantage of being able to serve as a dispersant with a lower viscosity and easier dispersibility. Although the amount of the dispersant of the present invention is determined in accordance with the selected pigment, the amount of resins dissolved in the ink without attaching to the pigment should preferably be no more than 4% by weight.

In using the dispersant in an aqueous system, a base is necessary. A preferable base include, for example, an organic base (e.g. ethanolamine, diethanolamine, triethanolamine, N-methylethanolamine, N-ethyldiethanolamine, 2-amino-2-methylpropanol, 2-ethyl-2-amino-1,3-propanediol, 2-(2-aminoethyl) ethanolamine, tris(hydromethyl)aminomethane, ammonia, piperidine, morpholine, β-dihydroxyethylurea) or an inorganic base (e.g. sodium hydroxide, potassium hydroxide, lithium hydroxide). Although an optimum type of base depends on the selected pigment and the kind of dispersant, the base should preferably be non-volatile and thus have a steady and excellent water-holding property. The amount of the base to be used is basically an amount of base required for neutralizing an amount obtained from calculating an acid value of the dispersant. In some cases, the amount of the base to be used may exceed the amount obtained from calculating the acid value. This is due in a case where there is a necessity, for example, to enhance dispersibility, to adjust the pH of ink, to adjust recording performance, or to enhance moisture retention property.

The solvent used for the ink of exemplary embodiment of the present invention is an organic solvent which is water-miscible. The organic solvent may be classified into three groups. A first group solvent has excellent moisture retention property, non-volatile property, and hydrophilicity. A second group solvent has an organic property to some extent, an excellent wettability for a hydrophobic surface, and an evaporation property (vaporization drying property). A third group solvent (monohydric alcohol class) has a suitable wettability and a low viscosity.

The first group solvent includes, for example, ethylene glycol, diethylene glycol, triethylene glycol, tripropylene glycol, glycerin, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerol monoallylether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentylglycol, ethyleneglycolmonomethylether, ethyleneglycolmonoethylether, ethyleneglycolmonoisopropylether, ethyleneglycolmonoallylether, diethyleneglycolmonomethylether, diethyleneglycolmonoethylether, triethyleneglycolmonomethylether, triethyleneglycolmonoethylether, propyleneglycolmonomethylether, dipropyleneglycolmonomethylether, β-dihydroxyethylurea, urea, acetonylacetone, pentaerythritol, and 1,4-cyclohexandiol.

The second group solvent includes, for example, hexyleneglycol, ethyleneglycolmonopropylether, ethyleneglycolmonobutylether, ethyleneglycolmonoisobutylether, ethyleneglycolmonophenylether, diethylenegylcoldiethylether, diethyleneglycolmonobutylether, diethyleneglycolmonoisobutylether, triethyleneglycolmonobutylether, triethyleneglycoldimethylether, triethyleneglycoldiethylether, tetraethyleneglycoldimethylether, tetraethyleneglycoldiethylether, propyleneglycolmonobutylether, dipropyleneglycolmonomethylether, dipropyleneglycolmonoethylether, dipropyleneglycolmonopropylether, dipropyleneglycolmonobutylether, tripropyleneglycolmonomethylether, glycerolmonoacetate, glyceroldiacetate, glyceroltriacetate, ethyleneglycolmonomethyletheracetate, diethyleneglycolmonomethyletheracetate, cyclohexanol, 1,2-cyclohexanediol, 1-butanol, 3-methyl-1, 5-pentanediol, 3-hexane-2, 5-diol, 2,3-butanediol, 1,5-pentanediol, 2,4-pentanediol, and 2,5-hexanediol.

The third group solvent includes, for example, ethanol, n-propanol, 2-propanol, 1-methoxy-2-propanol, furfuryl alcohol, and tetrahydrofurfuryl alcohol. The preferred amount of the aforementioned solvents contained in the ink is approximately 5% through 40% by weight.

A surfactant, a pH adjuster, a preservative, or the like may be added to the aqueous pigment-based ink of the present invention. The surfactant serves to be beneficial, for example, in modifying color ink with high penetrability or in adjusting a wettability against a surface of a nozzle or in heating in a case where the bubble inkjet type is employed. Commercially sold materials may be employed as the material used in manufacturing the ink. In summarizing the property of the ink of the present invention using the above-given materials, black ink should preferably have a high surface tension (approximately 30-60 dyn/cm), and the color ink should preferably have a low surface tension (approximately 10-40 dyn/cm).

Below is an example of a manufacturing method of the ink of the present invention, in a case where a dispersant is used for stably dispersing a pigment. The ink in this example is a pigment red-177 dispersion (anthraquinone based pigment) obtained by using an aqueous solvent in which a copolymer P composed of styrene/acrylic acid/ethyl acrylate (acid value: 290, weight-average molecular weight: 5,000, glass transition temperature: 77° C.) is dissolved with monoethanolamine. The pigment red-177 was obtained with the following materials;

| | |
|---|---|
| aqueous solvent of copolymer P (solid content 15% by weight) | 40 parts |
| pigment red-177 (Cromophtal Red A2B manufactured by Ciba-Geigy Ltd.) | 24 parts |
| diethylene glycol | 20 parts |
| isopropyl alcohol | 10 parts |
| water | 130 parts. |

The materials were disposed into a batch-vertical type sand mill (manufactured by Aimex Co. Ltd.) along with glass beads (1 mm diameter) used as media. Then, the materials in the mill were dispersed for three hours thus being water-cooled at the same time. Thereby, a crude dispersion with a viscosity of 30 cP and a pH of 9.8 was obtained. Then, the dispersed liquid was subject to a centrifuge process for removing large crude particles therefrom. By altering the conditions for performing the centrifuge process, various dispersions having pigment particles with average particle diameters ranging from 0.005 μm through 4 μm were obtained. Then, the dispersions were diluted with a composition of water, diethylene glycol, and ethyleneglycolmonobutylether (weight ratio of 60:25:15) to thereby obtain a red basic inkjet ink having a viscosity of 3 cP, a surface tension of 40 dyn/cm, and a pH of 9.5. The solid content of the final ink was approximately 7.5% by weight. The final amount of pigment contained in the ink was 5% by weight.

Accordingly, with the ink obtained by the foregoing manufacturing method, black letters or the like can be printed clearly, and thus images, graphs, and black letters bordering each other can be printed vividly without any blur or blotting by optimizing the particle diameter of the pigment particles in the black ink and the color ink and thus optimizing the wettability of the ink in relation to paper.

Next, another example for stably dispersing a pigment is given below. Although the aforementioned example uses a dispersant for enhancing the dispersibility of a pigment, the below-given example enhances dispersibility by surface processing (surface finishing) a pigment. As one example for enhancing dispersibility by surface processing a pigment, the surface of carbon black is hydrophilized by graft polymerization. In the graft polymerization, peroxide such as metal acrylate or ammonium acrylate is agitated with carbon black to create an area for graft reaction. Then, polymerization of monomer is performed with use of a radical polymerization initiator or an amine radical polymerization accelerator. Subsequently, a carbon black ink for inkjet recording can be obtained by diluting the polymer suspension containing the graft polymerized carbon black pigment and adding a typical inkjet additive such as a lubricant thereto.

Another example for enhancing dispersibility by surface processing a pigment is given below. The surface processing method includes the steps of (1) conducting an ultra violet process or an ozone process to a carbon black pigment under normal pressure, and (2) conducting a graft polymerization process to the carbon black by thermally polymerizing a vinyl group containing a monomer. Then, the surface processed carbon black is dispersed in water or/and a water soluble organic solvent.

With the other example, graft polymerization may be conducted without having foreign matter such as salt or radical polymerization agents included in the ink. This other example may also prevent problems such as blurring or blotting. The other example is described in more detail below.

The carbon black of the present invention may be manufactured by typically known methods such as a contact method, a furnace method, or a thermal method. The carbon black has a surface formed of functional groups such as carboxyl group, hydroxyl group, or a carbonyl group. By polymerizing the functional groups and the vinyl group containing monomer employed in the present invention, a carbon black having excellent dispersibility in water or a water soluble organic solvent can be obtained.

As a vinyl group containing monomer used in the present invention, there is, for example, acrylamide, N,N-dimethylacrylamide, acrylic acid, acrylonitrile, methacrylic acid, methyl methacrylate, or vinyl acetate (polyvinyl alcohol induced by vinyl acetate). Among the monomers, acrylamide is most preferable.

The ultra violet process or the ozone process serves to enhance the surface activity of the carbon black. In the process, peroxide is formed on a surface of a carbon black to thereby allow a vinyl group containing monomer to graft-polymerize directly to the surface of the carbon black. The time required for conducting the process ranges from 5 minutes to 2 hours. It is desired to conduct the process within the range since conducting the process longer than the range causes the peroxide to decompose.

In conducting the polymerization, oxygen being a polymerization inhibitor is removed by blowing in nitrogen, and then by applying heat thereto. In this case, a bond between a hydroxyl group and the peroxide on the surface of carbon black is broken to thereby allow polymerization of the monomer and grafting at the same time.

The required reaction time for the polymerization ranges from 30 minutes to 6 hours. Conducting the reaction longer than the range is possible; nevertheless, it would be wasteful. Furthermore, the required reaction temperature ranges from 30° C. to 60° C. Homopolymer being a by-product created after a cooling process may be removed by using common methods such as freeze-drying or centrifugal separation. Since unreacted monomers are highly water soluble, the monomers are washed with hot water.

In obtaining the processed carbon black of the present invention, the preferable weight ratio between the carbon black and the vinyl group containing monomer ranges from 10/1 to 10/100. Thereby, the surface of the carbon black can be processed (finished) uniformly, the carbon black and the vinyl group containing monomer can be bond strongly, and dispersibility of the processed carbon black inside an aqueous ink can be enhanced.

The obtained surface processed carbon black can easily disperse in water or a water-soluble organic solvent. The water-soluble organic solvent include, for example, polyvalent alcohols (e.g. glycerin, ethylene glycol, diethylene glycol, triethylene glycol, polyethylene glycol #200, #300, #400), alkylether derivatives of polyvalent alcohols (e.g. triethyleneglycolmonomethyletherethanol), ester derivatives of polyvalent alcohols (e.g. glycerylmonoacetate), nitrogen-containing cyclic compound (e.g. N-methyl-2-pyrrolidone), and lower alcohol having 1 to 6 carbon atoms (e.g. ethanol, n-propanol, iso-propanol).

The amount of the water-soluble organic solvent is 40% or less by weight with respect to the entire amount of the ink, more preferably, 3%-30% by weight.

Since the surface processed carbon black can disperse easily in water or the water-soluble organic solvent, there is no need to use a high shear dispersing apparatus such as a ball mill, a sand mill, or a roll mill. A supersonic dispersing apparatus such as a supersonic homogenizer will sufficient for conducting the dispersion.

Although it is necessary to account for degree of polymerization performed by surface processing, the amount of the surface processed carbon black used for the ink is 2% to 10% by weight. This amount results from taking ink color density and nozzle clog prevention into consideration (described below afterwards).

In addition, additives such as a viscosity modifier or a surface tension control agent for adjusting property of the ink, a pH adjuster, a fungicide, a preservative, or a resin used as a binder may also be added according to circumstance.

An example of an ink manufactured by the foregoing method is described below in detail.

EXAMPLE 1

| | |
|---|---|
| **Component A** | |
| carbon black #25 (manufactured by Mitsubishi Chemical Corp.) | 20 parts |
| acrylamide | 10 parts |
| water | 90 parts |
| **Component B** | |
| surface processed carbon black | 5 parts |
| glycerin | 2 parts |
| ethanol | 6 parts |
| water | 87 parts |

The carbon black is disposed under a high intensity discharge lamp to be irradiated with an ultra violet light for 20 minutes. Then, the component A containing the ultra violet processed carbon black is mixed, agitated under 70° C. while blowing in nitrogen gas into the solvent, and is polymerized for 50 minutes. Then, the polymer is disposed in a centrifugal separator and rotated 12,000 times for 70 minutes, to thereby sufficiently remove homopolymer therefrom. Then, the polymer is washed by being agitated with hot water for 150 minutes. Then, the polymer is dried. Next, the component B is mixed with the polymer. In consequence, after modifying particle diameter with an ultrasonic homogenizer and removing foreign matter and large sized particles with a 0.2 μm membrane filter, ink for inkjet recording can be obtained. The ink provides satisfactory pigment dispersibility and excellent preservation stability.

EXAMPLE 2

| | |
|---|---|
| Component A | |
| carbon black MA-7 (manufactured by Mitsubishi Chemical Corp.) | 10 parts |
| acrylic acid | 90 parts |
| water | 210 parts |
| Component B | |
| surface processed carbon black | 3 parts |
| glycerin | 10 parts |
| 1-propanol | 4 parts |
| water | 83 parts |

The carbon black is disposed under a high intensity discharge lamp to be irradiated with an ultra violet light for 15 minutes. Then, the component A containing the ultra violet processed carbon black is mixed, agitated under 65° C. while blowing in nitrogen gas into the solvent, and is polymerized for 100 minutes. Then, the polymer is disposed in a centrifugal separator and rotated 13,000 times for 90 minutes, to thereby sufficiently remove homopolymer therefrom. Then, the polymer is washed by being agitated with hot water for 180 minutes. Then, the polymer is dried. Next, the component B is mixed with the polymer. In consequence, after modifying particle diameter with an ultrasonic homogenizer and removing foreign matter and large sized particles with a 0.2 μm membrane filter, another ink for inkjet recording can be obtained. The ink also provides satisfactory pigment dispersibility and excellent preservation stability.

EXAMPLE 3

| | |
|---|---|
| Component A | |
| carbon black MA-600 (manufactured by Mitsubishi Chemical Corp.) | 10 parts |
| N,N-dimethylacrylamide | 50 parts |
| water | 200 parts |
| Component B | |
| surface processed carbon black | 3 parts |
| ethyleneglycol | 4 parts |
| ethanol | 5 parts |
| water | 88 parts |

The carbon black is applied with ozone gas with an ozone generating apparatus (voltage: 60V, frequency: 50 Hz, oxygen flow rate: 40 ml/min). Then, the component A containing the ozone processed carbon black is mixed, agitated under 50° C. while blowing in nitrogen gas into the solvent, and is polymerized for 150 minutes. Then, the polymer is disposed in a centrifugal separator and rotated 12,000 times for 80 minutes, to thereby sufficiently remove homopolymer therefrom. Then, the polymer is washed by being agitated with hot water for 180 minutes. Then, the polymer is dried. Next, the component B is mixed with the polymer. In consequence, after modifying particle diameter with an ultrasonic homogenizer and removing foreign matter and large sized particles with a 0.2 μm membrane filter, another ink for inkjet recording can be obtained. The ink also provides satisfactory pigment dispersibility and excellent preservation stability.

Accordingly, with the methods of using a dispersant and surface processing a pigment for enhancing dispersibility of a pigment, an ink having a steady pigment dispersibility and excellent preservation stability can be obtained even with respect to pigments with particles having extremely fine particle diameter (minimum particle diameter of 0.005 m).

Next, the pigment-based ink of the present invention will be described hereinafter from an aspect of wettability with respect to a recording medium. In a case where paper, for example, is the recording medium, wetting is a phenomenon that occurs before ink penetrates into the paper.

As described above, paper is a material manufactured by suspending plant fibers in water, filtering the water, and tangling the fibers into flat and thin form. Nevertheless, owing to recent advances in paper manufacturing and coating technology, paper is not to be considered as a mere aggregation of fibers. In fact, it is essential to observe the behavior of ink in an order of magnitude of several ten milliseconds when the ink contacts the paper. A dynamic contact angle analyzer using the Wilhelmy method (e.g. WET-3000 manufactured by Rhesca Co. Ltd.) may, for example, be employed in measuring the wetting interaction between the ink and the paper. In this embodiment, however, a static contact angle analyzer known as a goniometer is used, in which contact angle is measured by dropping ink on the paper. However, in addition to the goniometer, a high speed camera is employed for observing the behavior of the contact angle from a chronic aspect, to thereby record changes of the contact angle in an order of magnitude of several milliseconds to several ten milliseconds. Furthermore, the shapes of the pixels were evaluated by a sensory test using microscopic images magnified 100 times.

Conditions such as the recording head or the ink used for the forming of pixels are the same as those previously used in evaluating the surface characteristics of the paper and the shapes of the pixels. Furthermore, the particle diameter of the pigment in the ink is 0.05 μm.

Figure 7:
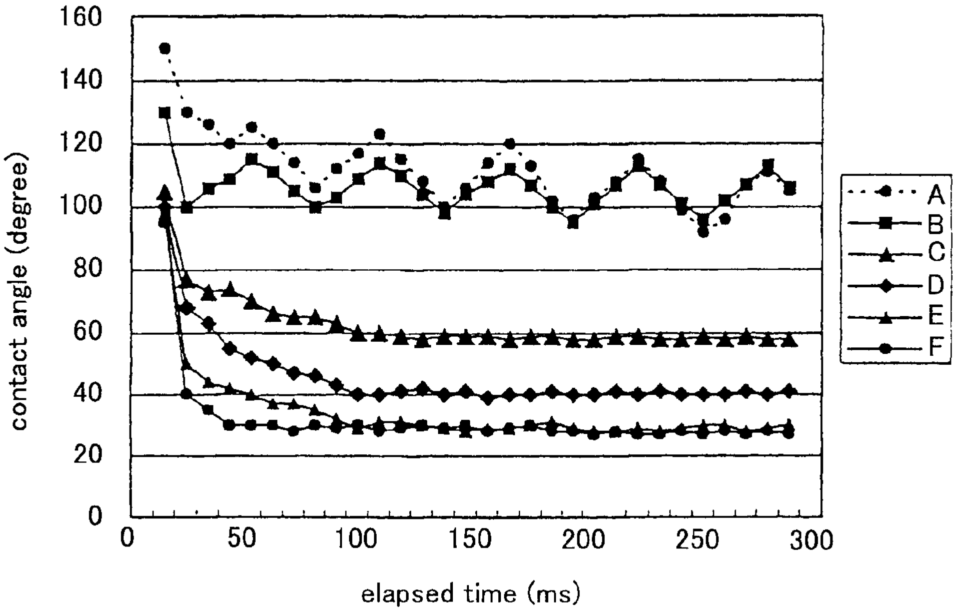
FIG. 7 is a diagram showing change of contact angle in relation to time in a case when a droplet of ink contacts (adheres) to a paper surface.

FIG. 7 shows a result of measuring chronic changes of contact angle with the foregoing method. Six kinds of paper A through F (although D is technically a resin material (polyethylene film) coated with calcium carbonate formed of particles with particle diameter of 1 μm) were used. The papers had a fiber thickness ranging from 5 μm through 10 μm. The size of the spaces formed between overlapping fibers of the papers ranged from 1 μm through 2 μm. The smoothness of the papers or the resin material ranged from 1 s through 2 s.

Densities of the papers A through F (except for D) are given below.

A: 0.96 g/cm$^3$

B: 0.41 g/cm$^3$

C: 0.78 g/cm$^3$

E: 0.58 $g/cm^3$

F: 0.62 $g/cm^3$

The term “density” in this context, however, applies to density typically used in the field of paper manufacturing, wherein the density in this context is derived from dividing weight (weight (grams) per 1 $m^2$) by thickness. Therefore, the density in this context is technically different from the term density used in the field of physics.

According to the result obtained from evaluating the shapes of the pixels, dot shapes for papers A and B had the worst shape in which the dots were immensely deformed. The dot shapes for paper C was good. However, dot shapes for the papers E and F, and the resin material D were even better being formed in excellent round shapes. It is to be noted that the evaluation was performed by a sensory test using microscopic images magnified 100 times, in which 20 samples were extracted from each of the papers for the evaluation.

According to the results of the papers C, E, F and the resin material D, excellent round pixels can be obtained when contact angle stop changing when 100 ms or less elapses after the recording liquid contacts the paper (or resin material). Furthermore, according to the results of the papers A and B, poorly shaped pixels are formed when the contact angle continues to change after contacting the paper. In addition, the contact angles of the papers with poorly shaped pixels were relatively high (100 degrees or more).

In the evaluation, the wetting interaction between the ink and the paper was observed in a period of 300 ms after the ink had contacted the paper. Even with respect to papers A or B, once 30-40 seconds elapses after the ink contacts the papers, the ink would penetrate into the papers, or the solvent components would dry in the papers. Therefore, there will be no such concept as “contact angle”, once 30-40 seconds elapses after the ink contacts the paper. This also applies to papers C, E, F and resin material D. It is also to be noted that the evaluation of the pixel shapes was performed after the ink had completely penetrated into the paper or after the solvent completely dried had dried in the papers.

Therefore, any type of media including plain paper (e.g. wood free paper, ground wood printing paper, or bond paper), coated paper, or OHP plastic film may be employed by optimizing the relation between the ink and the recording medium. As mentioned above, the present invention may be applied to any type of inkjet recording method. Nevertheless, the present invention is particularly suitable for the bubble jet recording method since the present invention is able to eject ink with extreme stability and prevent problems such as creation of satellite ink droplets. However, in using the bubble jet recording method, there may be a necessity to adjust physical properties related to heat such as specific gravity, coefficient of thermal expansion, and thermal conductivity.

Next, a further characteristic of the present invention will be described below. As described above, the present invention relates to an inkjet recording method, in which ink is ejected from a fine sized orifice. For the inkjet recording method, clogging created at a discharge port (nozzle) is a crucial problem. Such clogging is more likely to be caused with a pigment-based ink rather than a dye-based ink. This is due from the fact that the pigment in the pigment-based ink is dispersed in a solvent rather than being dissolved as with a dye of a dye-based ink. Furthermore, clogging is especially a crucial problem since the present invention is aimed to be applied to an inkjet recording head with a discharge port having a fine orifice size (for example, a round orifice with a diameter no more than ϕ25 μm (a size equivalent to an area that is less than 500 $\mu m^2$)) which is a size unlike no other discharge port of a conventional recording head.

Such clogging is basically caused by the fact that the orifice from which ink is ejected has an extremely small size. Clogging is closely related to the size of the orifice of the discharge port and the size of the pigment inside the ejected ink.

Accordingly, by focusing on the size of the orifice of the discharge port and the size of the particles of the pigment, the inventor of the present invention has found a particular relation between clogging, the size of the orifice of the discharge port and the size of the particles of the pigment. This relation has been found by conducting an experiment including the procedures of formulating inks with various pigment particle diameter, then ejecting the inks from inkjet recording heads with orifices of prescribed sizes for a prescribed period, then allowing the inkjet recording head to stand for a prescribed period, then resuming the ejection of the inks and then examining whether the orifices are clogged. In examining the orifices, not only completely clogged orifices were deemed to be clogged, but also partially clogged orifices and even orifices only showing slight signs of clogging were also deemed to be clogged.

Each of the recording heads used in the experiment for examining the clogging is an inkjet similar to the thermal type inkjet recording head shown in FIG. 1. In the recording head shown in FIG. 1, the end portions of the flow paths 5 serve as the discharge ports 4 of the recording head. However, each of the inkjet recording heads used in the experiment additionally has a nozzle plate 20 formed of nozzles 21 arranged to provide a density (dpi) same as that of flow path 5 of the recording head shown in FIG. 1. FIG. 3A is a perspective view showing one of the recording heads used in the experiment where the nozzle plate 20 is not yet attached thereto, and FIG. 3B is a perspective view showing one of the recording heads used in the experiment where the nozzle plate 20 is attached thereto. FIGS. 1, 3A, and 3B are simplified diagrams showing the recording heads with merely four discharge ports (nozzles). Nevertheless, the number of discharge ports for each of the recording heads used in the experiment is actually 256 ports, and the density of each of the recording heads is 600 dpi. In the experiment, the size of the heating element 9 was 20 μm×85 μm, the resistance thereof was 105Ω, the drive voltage for the ejection of ink was 22V, the drive pulse width was 6 μs, and the drive frequency was 12 kHz. It is to be noted that recording heads H1 through H4 were used in the experiment (orifice diameters of the discharge port for recording heads H1 through H4 are: H1=ϕ25 μm, H2=ϕ20 μm, H3=ϕ15 μm, and H4=ϕ10 μm). The thickness of the nozzle plate 20 was 40 μm.

Several kinds of ink having pigment particles with particle diameters ranging from 0.003 μm through 2 μm were used in the experiment. The ink were used in relation to H1 through H4 having discharge ports of different sizes. After conducting ejection for a prescribed period, the recording heads were allowed to stand for 10 hours under an atmosphere of 40° C., and a humidity of 30%.

The method of manufacturing the ink is described below. With the method, a carbon black dispersion was obtained by using a solvent which has a copolymer P comprised of styrene/methacrylate acid/butylacrylate (acid value: 325, weight-average molecular weight: 11,000, glass transition temperature: 84° C.) dissolved with kalium. The carbon black dispersion was obtained with the following materials:

| | |
|---|---|
| aqueous solvent of copolymer P (solid content 20% by weight) | 40 parts |
| carbon black (MA-800 manufactured by Mitsubishi Chemical Corp.) | 25 parts |
| diethylene glycol | 20 parts |
| isopropyl alcohol | 10 parts |
| water | 130 parts. |

The materials are disposed into a batch-vertical type sand mill (manufactured by Aimex Co. Ltd.) which is included with glass beads (1 mm diameter) serving as media. Then, the materials in the mill were dispersed for three hours thus being water-cooled at the same time. Thereby, a crude dispersion with a viscosity of 16 cP and a pH of 9.7 was obtained. Then, the dispersed liquid was subject to a centrifuge process to remove large crude particles therefrom. By altering the conditions for the centrifuge process, dispersions D1 through D22 having pigment particles with average particle diameters ranging from 0.005 μm through 1 μm were obtained. Then, the dispersions were diluted with water to thereby obtain black basic ink B1 through B22 having a viscosity of 2.4 cP, a surface tension of 46 dyn/cm, and a pH of 9.5. The solid content of the final ink was approximately 7% by weight. The final amount of pigment contained in the ink was 5% by weight. It is to be noted that the average particle diameters were measured by an electrophoretic light scattering photometer (ELS-800 manufactured by Otsuka Electronics Co. Ltd.). The average value was obtained from an initial gradient of an autocorrelation function.

The inks B1 through B22 were experimented in combination with the recording heads H1 through H4 so as to evaluate clogging. The results of the evaluation are shown in tables 5 through B.

Table 5 shows the results for recording head H1 (orifice diameter of discharge port Do=ϕ25 μm), table 6 shows the results for recording head H2 (orifice diameter of discharge port Do=ϕ20 μm), table 7 shows the results for recording head H3 (orifice diameter of discharge port Do=ϕ15 μm), and table 8 shows the results for recording head H4 (orifice diameter of discharge port Do=ϕ10 μm. In the tables, grade "○" indicates that ink can be ejected sufficiently and can be employed for practical use, and grade "Δ" indicates that ink can be ejected but in a relatively insufficient manner, and grade "X" indicates that ink cannot be ejected sufficiently and cannot be employed for practical use.

TABLE 5

Head H1 (orifice diameter of nozzle Do = ϕ 25 μm)

| Ink | Pigment Particle Diameter Dp (μm) | Dp/Do | State of Clogging Number of Clogged Nozzles/Total Number of Nozzles | Grade |
|---|---|---|---|---|
| B1 | 0.003 | 0.00012 | 1) | X |
| B2 | 0.005 | 0.0002 | 0/256 | ○ |
| B3 | 0.01 | 0.0004 | 0/256 | ○ |
| B4 | 0.02 | 0.0008 | 0/256 | ○ |
| B5 | 0.03 | 0.0012 | 0/256 | ○ |
| B6 | 0.04 | 0.0016 | 0/256 | ○ |
| B7 | 0.05 | 0.002 | 0/256 | ○ |
| B8 | 0.06 | 0.0024 | 0/256 | ○ |
| B9 | 0.07 | 0.0028 | 0/256 | ○ |
| B10 | 0.08 | 0.0032 | 0/256 | ○ |

TABLE 5-continued

Head H1 (orifice diameter of nozzle Do = ϕ 25 μm)

| Ink | Pigment Particle Diameter Dp (μm) | Dp/Do | State of Clogging Number of Clogged Nozzles/Total Number of Nozzles | Grade |
|---|---|---|---|---|
| B11 | 0.09 | 0.0036 | 0/256 | ○ |
| B12 | 0.1 | 0.004 | 0/256 | ○ |
| B13 | 0.15 | 0.006 | 0/256 | ○ |
| B14 | 0.2 | 0.008 | 0/256 | ○ |
| B15 | 0.25 | 0.01 | 0/256 | ○ |
| B16 | 0.3 | 0.012 | 0/256 | ○ |
| B17 | 0.4 | 0.016 | 0/256 | ○ |
| B18 | 0.5 | 0.02 | 0/256 | ○ |
| B19 | 0.7 | 0.028 | 4/256 (Partially Clogged) | Δ |
| B20 | 1 | 0.04 | 7/256 (Partially Clogged) | Δ |
| B21 | 1.5 | 0.06 | 41/256 (Completely Clogged) | X |
| B22 | 2 | 0.08 | 186/256 (Completely Clogged) | X |

1) Not evaluated due to ink instability

TABLE 6

Head H2 (orifice diameter of nozzle Do = ϕ 20 μm)

| Ink | Pigment Particle Diameter Dp (μm) | Dp/Do | State of Clogging Number of Clogged Nozzles/Total Number of Nozzles | Grade |
|---|---|---|---|---|
| B1 | 0.003 | 0.00015 | 1) | X |
| B2 | 0.005 | 0.00025 | 0/256 | ○ |
| B3 | 0.01 | 0.0005 | 0/256 | ○ |
| B4 | 0.02 | 0.001 | 0/256 | ○ |
| B5 | 0.03 | 0.0015 | 0/256 | ○ |
| B6 | 0.04 | 0.002 | 0/256 | ○ |
| B7 | 0.05 | 0.0025 | 0/256 | ○ |
| B8 | 0.06 | 0.003 | 0/256 | ○ |
| B9 | 0.07 | 0.0035 | 0/256 | ○ |
| B10 | 0.08 | 0.004 | 0/256 | ○ |
| B11 | 0.09 | 0.0045 | 0/256 | ○ |
| B12 | 0.1 | 0.005 | 0/256 | ○ |
| B13 | 0.15 | 0.0075 | 0/256 | ○ |
| B14 | 0.2 | 0.01 | 0/256 | ○ |
| B15 | 0.25 | 0.0125 | 0/256 | ○ |
| B16 | 0.3 | 0.015 | 0/256 | ○ |
| B17 | 0.4 | 0.02 | 0/256 | ○ |
| B18 | 0.5 | 0.025 | 5/256 (Partially Clogged) | Δ |
| B19 | 0.7 | 0.035 | 12/256 (Partially Clogged) | Δ |
| B20 | 1 | 0.05 | 31/256 (Completely Clogged) | X |
| B21 | 1.5 | 0.075 | 74/256 (Completely Clogged) | X |

TABLE 6-continued

| Head H2 (orifice diameter of nozzle Do = ϕ 20 μm) | | | | |
|---|---|---|---|---|
| | Pigment Particle Diameter | | State of Clogging Number of Clogged Nozzles/Total | |
| Ink | Dp (μm) | Dp/Do | Number of Nozzles | Grade |
| B22 | 2 | 0.1 | 256/256 (Completely Clogged) | X |

1) Not evaluated due to ink instability

TABLE 7

| Head H3 (orifice diameter of nozzle Do = ϕ 15 μm) | | | | |
|---|---|---|---|---|
| | Pigment Particle Diameter | | State of Clogging Number of Clogged Nozzles/Total | |
| Ink | Dp (μm) | Dp/Do | Number of Nozzles | Grade |
| B1 | 0.003 | 0.0002 | 1) | X |
| B2 | 0.005 | 0.00033 | 0/256 | ○ |
| B3 | 0.01 | 0.00067 | 0/256 | ○ |
| B4 | 0.02 | 0.00133 | 0/256 | ○ |
| B5 | 0.03 | 0.002 | 0/256 | ○ |
| B6 | 0.04 | 0.00267 | 0/256 | ○ |
| B7 | 0.05 | 0.00333 | 0/256 | ○ |
| B8 | 0.06 | 0.004 | 0/256 | ○ |
| B9 | 0.07 | 0.00467 | 0/256 | ○ |
| B10 | 0.08 | 0.00533 | 0/256 | ○ |
| B11 | 0.09 | 0.006 | 0/256 | ○ |
| B12 | 0.1 | 0.00667 | 0/256 | ○ |
| B13 | 0.15 | 0.01 | 0/256 | ○ |
| B14 | 0.2 | 0.01333 | 0/256 | ○ |
| B15 | 0.25 | 0.01667 | 0/256 | ○ |
| B16 | 0.3 | 0.02 | 0/256 | ○ |
| B17 | 0.4 | 0.02667 | 8/256 (Partially Clogged) | Δ |
| B18 | 0.5 | 0.03333 | 20/256 (Partially Clogged) | Δ |
| B19 | 0.7 | 0.04667 | 89/256 (Completely Clogged) | X |
| B20 | 1 | 0.06667 | 144/256 (Completely Clogged) | X |
| B21 | 1.5 | 0.1 | 256/256 (Completely Clogged) | X |
| B22 | 2 | 0.13333 | 256/256 (Completely Clogged) | X |

1) Not evaluated due to ink instability

TABLE 8

| Head H4 (orifice diameter of nozzle Do = ϕ 10 μm) | | | | |
|---|---|---|---|---|
| | Pigment Particle Diameter | | State of Clogging Number of Clogged Nozzles/Total | |
| Ink | Dp (μm) | Dp/Do | Number of Nozzles | Grade |
| B1 | 0.003 | 0.0003 | 1) | X |
| B2 | 0.005 | 0.0005 | 0/256 | ○ |
| B3 | 0.01 | 0.001 | 0/256 | ○ |
| B4 | 0.02 | 0.002 | 0/256 | ○ |
| B5 | 0.03 | 0.003 | 0/256 | ○ |
| B6 | 0.04 | 0.004 | 0/256 | ○ |
| B7 | 0.05 | 0.005 | 0/256 | ○ |
| B8 | 0.06 | 0.006 | 0/256 | ○ |
| B9 | 0.07 | 0.007 | 0/256 | ○ |
| B10 | 0.08 | 0.008 | 0/256 | ○ |
| B11 | 0.09 | 0.009 | 0/256 | ○ |
| B12 | 0.1 | 0.01 | 0/256 | ○ |
| B13 | 0.15 | 0.015 | 0/256 | ○ |
| B14 | 0.2 | 0.02 | 0/256 | ○ |
| B15 | 0.25 | 0.025 | 8/256 (Partially Clogged) | Δ |
| B16 | 0.3 | 0.03 | 55/256 (Completely Clogged) | X |
| B17 | 0.4 | 0.04 | 132/256 (Completely Clogged) | X |
| B18 | 0.5 | 0.05 | 256/256 (Completely Clogged) | X |
| B19 | 0.7 | 0.07 | 256/256 (Completely Clogged) | X |
| B20 | 1 | 0.1 | 256/256 (Completely Clogged) | X |
| B21 | 1.5 | 0.15 | 256/256 (Completely Clogged) | X |
| B22 | 2 | 0.2 | 256/256 (Completely Clogged) | X |

1) Not evaluated due to ink instability

Accordingly, ink can be stably ejected without any clogging by satisfying a relation of $0.0005 \leqq Dp/Do \leqq 0.02$, wherein "Dp" represents particle diameter of the fine particles of the pigment, wherein "Do" represents a size of the nozzle (in this experiment, "Do" represents a diameter of the nozzle since the nozzle has a round shape), and wherein each discharge port (nozzle) of a recording head has a diameter ranging from ϕ10 μm through ϕ25 μm. In the above experiment, each discharge port (nozzle) was formed with a round shape. Nevertheless, since a nozzle diameter of 25 μm or less is equivalent to an area that is less than 500 $\mu m^2$, each of the discharge ports (nozzles) may be formed into other shapes (e.g. polygon) as long as a size (diameter) of each discharge port (nozzle) can be converted into an area that is less than 500 $\mu m^2$.

Next, a further characteristic of the present invention will be described below. As described above, the present invention is aimed to be used for a pigment-based ink. Unlike a dye-based ink using a colorant in which dye is dissolved in a solvent such as water, the pigment-based ink uses a colorant in which fine particles of pigment are not dissolved but dispersed in a solvent. Solid content in the ink such as the pigment or solid content in a dispersant has a large effect on the problem of clogging. Accordingly, in an experiment described below, the problem of clogging has been observed in relation to the amount of pigment in the ink and the amount of solid content in the ink.

The relation between clogging and the amount of solid content in ink was experimented by altering the amount of pigment contained in the ink and the amount of dispersant (in this case, the amount of copolymer P composed of styrene/methacrylic acid/butylacrylate). In the experiment, the recording head H2 (orifice diameter of discharge port Do=ϕ20 μm) and the ink B5 (pigment particle diameter Dp=0.03 μm) were used. The experiment was performed in the same manner as in the previous experiment for evaluating clogging in relation to orifice diameter of an inkjet recording head and pigment particle diameter. The results of the evaluation are shown in Tables 9 and 10. In the tables 9 and 1.0, grade "○" indicates that the ink can be satisfactorily employed for practical use, and grade "X" indicates that the ink can by no means be employed for practical use.

TABLE 9

| Amount of Pigment in the Ink By Weight % | Amount of Solid Content in the Ink By Weight % | Number of Clogged Ports Number of Clogged Ports/Total Number of Ports | Grade |
|---|---|---|---|
| 1 | 3 | 0/256 | X 1) |
| 1 | 6 | 0/256 | X 1) |
| 1 | 10 | 0/256 | X 1) |
| 1 | 15 | 0/256 | X 1) |
| 1 | 20 | 31/256 | X 1) |
| 2 | 3 | 0/256 | ○ |
| 2 | 6 | 0/256 | ○ |
| 2 | 10 | 0/256 | ○ |
| 2 | 15 | 0/256 | ○ |
| 2 | 20 | 33/256 | X |
| 3 | 6 | 0/256 | ○ |
| 3 | 10 | 0/256 | ○ |
| 3 | 15 | 0/256 | ○ |
| 3 | 20 | 45/256 | X |
| 4 | 6 | 0/256 | ○ |
| 4 | 10 | 0/256 | ○ |
| 4 | 15 | 0/256 | ○ |
| 4 | 20 | 48/256 | X |
| 5 | 6 | 0/256 | ○ |
| 5 | 10 | 0/256 | ○ |
| 5 | 15 | 0/256 | ○ |
| 5 | 20 | 58/256 | X |
| 6 | 6 | 0/256 | ○ |
| 6 | 10 | 0/256 | ○ |
| 6 | 15 | 0/256 | ○ |
| 6 | 20 | 57/256 | X |

1) Low color density and impractical

TABLE 10

| Amount of Pigment in the Ink By Weight % | Amount of Solid Content in the Ink By Weight % | Number of Clogged Ports Number of Clogged Ports/Total Number of Ports | Grade |
|---|---|---|---|
| 7 | 6 | 0/256 | ○ |
| 7 | 10 | 0/256 | ○ |
| 7 | 15 | 0/256 | ○ |
| 7 | 20 | 60/256 | X |
| 8 | 6 | 0/256 | ○ |
| 8 | 10 | 0/256 | ○ |
| 8 | 15 | 0/256 | ○ |
| 8 | 20 | 105/256 | X |
| 9 | 6 | 0/256 | ○ |
| 9 | 10 | 0/256 | ○ |
| 9 | 15 | 0/256 | ○ |
| 9 | 20 | 151/256 | X |
| 10 | 6 | 0/256 | ○ |
| 10 | 10 | 0/256 | ○ |
| 10 | 15 | 0/256 | ○ |
| 10 | 20 | 166/256 | X |
| 11 | 6 | 20/256 | X |
| 11 | 10 | 71/256 | X |
| 11 | 15 | 256/256 | X |
| 11 | 20 | 256/256 | X |
| 12 | 6 | 256/256 | X |
| 12 | 10 | 256/256 | X |
| 12 | 15 | 256/256 | X |
| 12 | 20 | 256/256 | X |

Accordingly, clogging can be prevented where the amount of pigment in the ink ranges from 1% to 10% by weight, and thus where the amount of solid content in the ink is no more than 15% by weight. Although clogging will not occur when the amount of pigment in the ink is 1% by weight, the concentration of the ink is relatively low from an aspect of employing the ink for practical use. However, this ink may be employed to serve as a light color for a recording apparatus using ink with various shades of color. In addition, this ink may also be employed by adding a dye thereto for compensating the lack of color density.

Next, a further characteristic of the present invention will be described below. Owing to the fact that the inkjet recording head of the present invention is preferably employed for color recording (multicolor recording), an example of a color inkjet recording head which is preferably employed for the present invention is described below.

Figure 8:
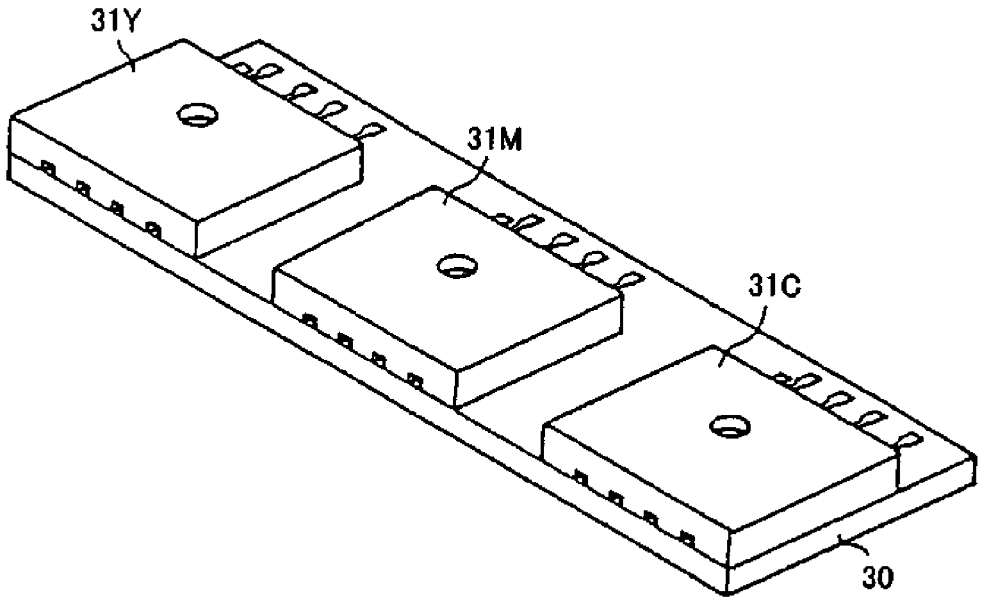
FIG. 8 is a view showing an example of another liquid jet head.

FIG. 8 shows the example of the liquid jet recording head (recording head portion). The liquid jet recording head has a heating element substrate 30 which serves as a common base plate for nozzle elements (recording heads) 31Y, 31M, and 31C disposed thereon. Plural colors (in this example, yellow (Y), magenta (M), and cyan (C)) of ink are ejected from the nozzle elements 31Y, 31M, and 31C. In this example and other examples described below, each of the nozzle elements corresponding to respective colors is illustrated having four or five discharge ports (nozzles) for the purpose of simplifying the drawings. Nevertheless, in actual use, each of the nozzle elements is formed preferably with 64 through 1024 discharge ports.

Figure 9:
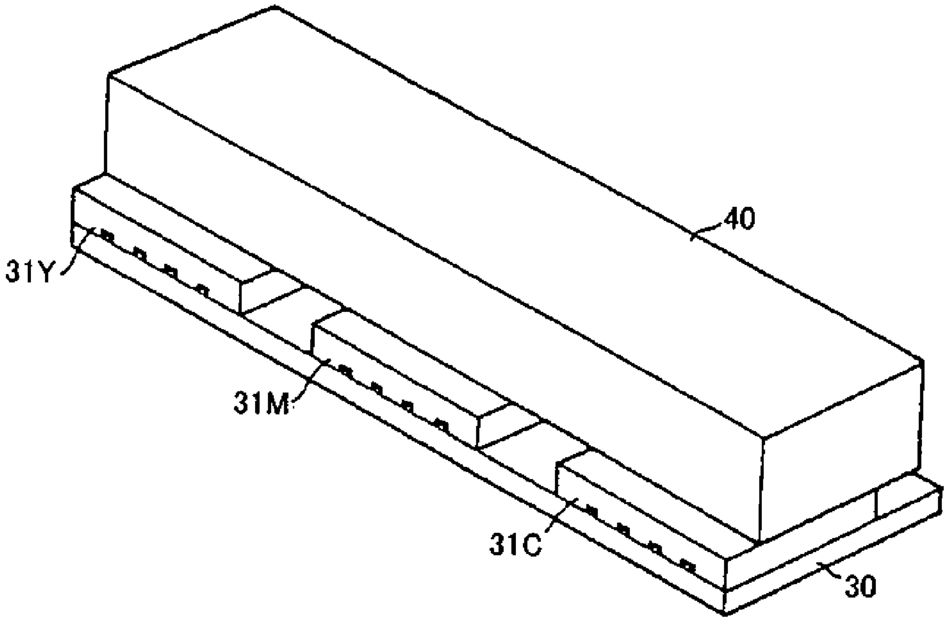
FIG. 9 is a view showing an example of a recording head portion in FIG. 8 having an ink tank (recording liquid container portion) provided therewith.

FIG. 9 shows the recording head portion illustrated in FIG. 8 having an ink tank portion (recording liquid container portion) 40 disposed thereon. The ink tank portion 40 supplies yellow, magenta, and cyan ink to the recording head portion. It is, however, to be noted that the structure of the recording head and the ink tank portion 40 illustrated in FIG. 9 is aimed merely for describing a concept of the present invention, and is different from that employed in actual use (described below).

Figure 10:
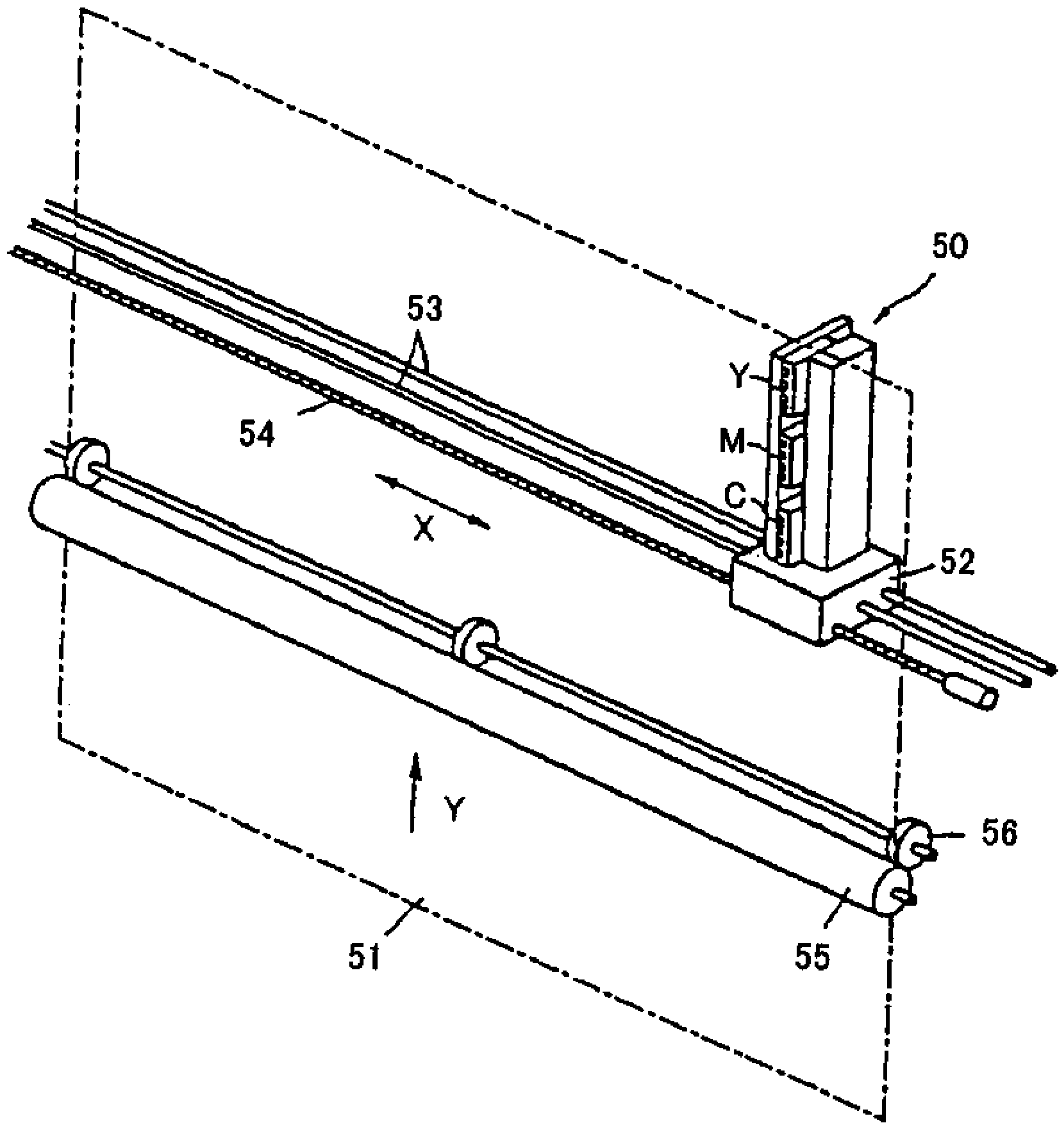
FIG. 10 is an example of a serial printer (liquid jet recording apparatus) having a liquid jet head.

FIG. 10 shows an example of a liquid jet recording apparatus (so-called serial printer) where the liquid jet head of the present invention is mounted on a carriage. Numeral 50 indicates the liquid jet head of the present invention, numeral 51 indicates a recording medium, numeral 52 indicates a carriage, numeral 53 indicates a guiding rod for guiding the carriage 52, numeral 54 indicates a screw rod for transporting the carriage 52, numeral 55 indicates a conveying roller for conveying the recording medium 51, and numeral 56 indicates a holding roller for holding the recording medium 51. The liquid jet head 50, which has nozzle elements Y, M, C for yellow, magenta, and cyan aligned in a vertical direction (direction indicated with arrow Y), performs recording by traversing back and forth against the recording medium 51 in a direction indicated with arrow X. In the present invention, the recording medium 51 is conveyed in the Y arrow direction each time the carriage 53 completes scanning. Therefore, the recording distance covered by a single scan is equal to the length of the alignment of the nozzle elements of the recording head 50. Furthermore, since the nozzle elements Y, M, C for yellow, magenta, and cyan are aligned vertically in a single row, the area for recording yellow images, magenta images, and cyan images will overlap when the scanning is performed twice or more, thereby, achieving full color recording.

Although the exemplary example of the liquid jet head records with three colors comprising yellow, magenta, and cyan, the present invention may further be employed for recording a fourth color, such as black (B). This can be achieved by adding another nozzle element 31B to the liquid jet head shown in FIG. 8 (see for example FIG. 11).

Figure 11:
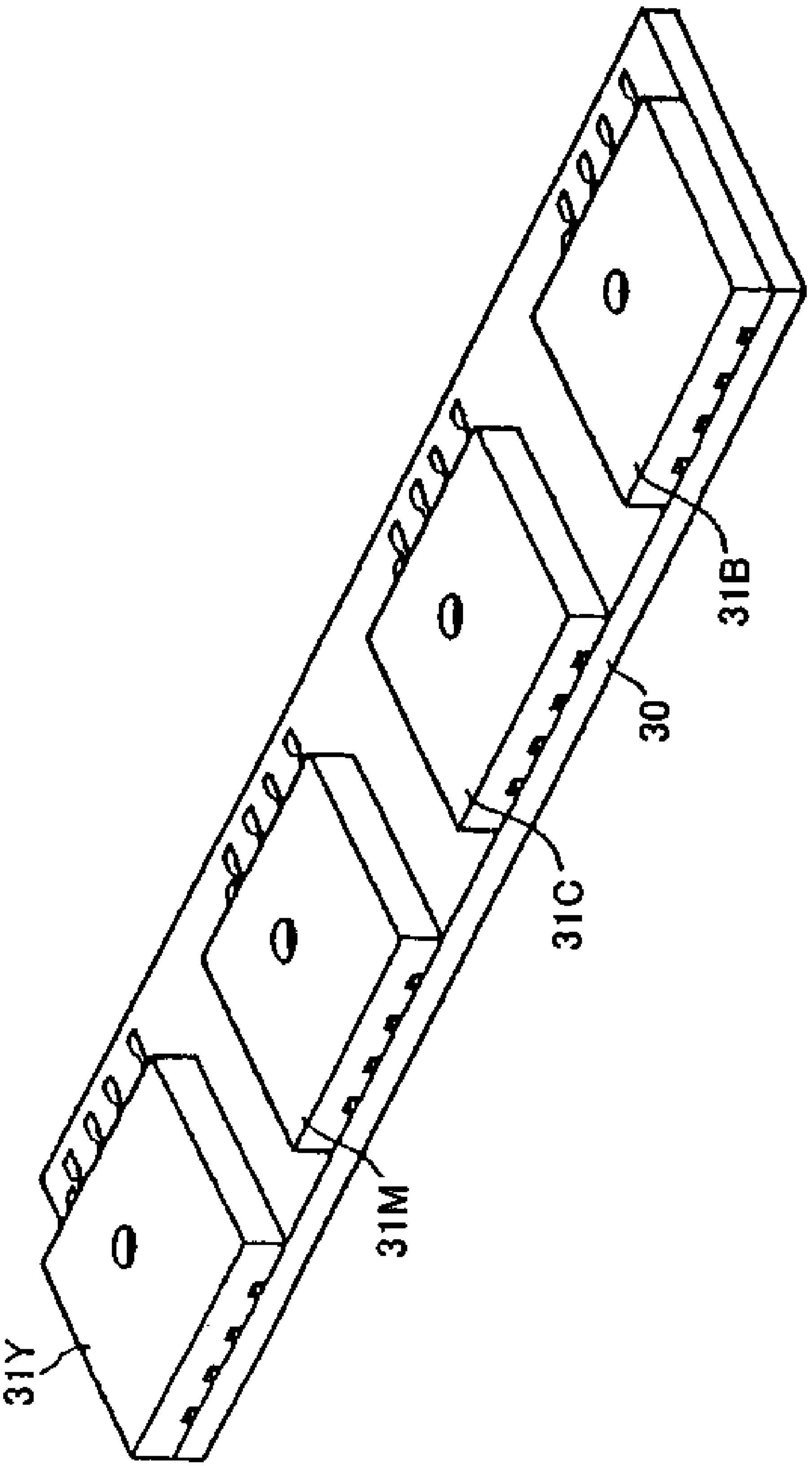
FIG. 11 is a view showing an example of an alignment of nozzle elements (recording heads) for four colors.
Figure 12:
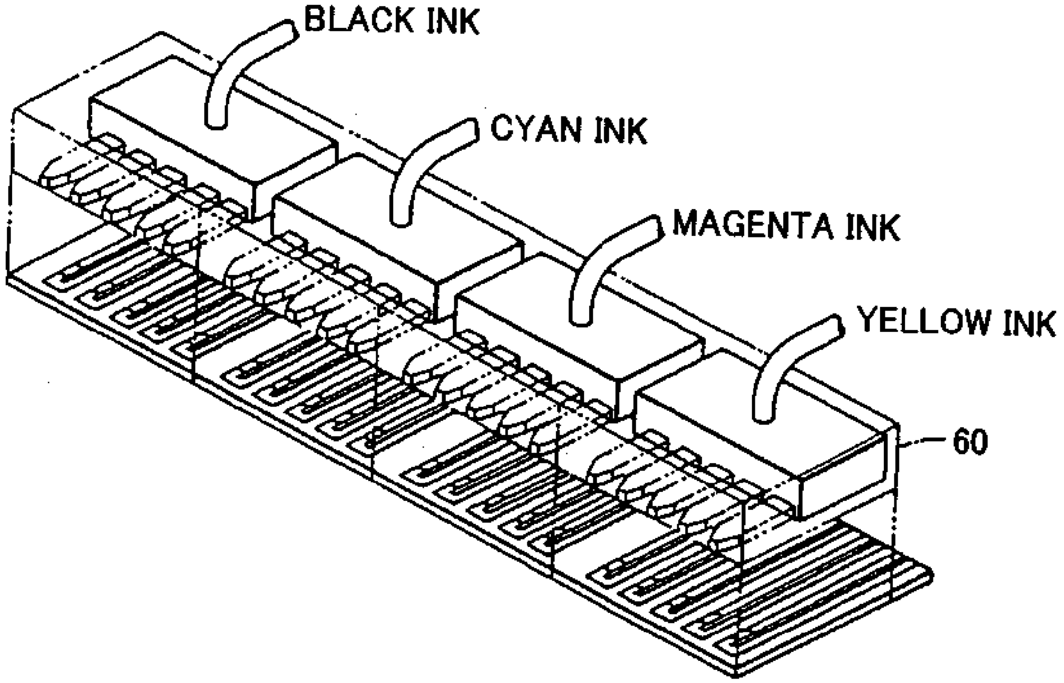
FIG. 12 is a view showing an example of nozzle elements (recording heads) for four colors being integrally formed.

FIG. 12 is another example showing an alignment of nozzle elements for four colors. Although FIG. 11 shows a liquid jet head in which flow paths corresponding to each color are formed separately, in the liquid jet head shown in FIG. 12, flow paths corresponding to each color are integrally formed with a plastic mold member 60. Thereby, assembly cost of the recording head can be reduced significantly.

Figure 13:
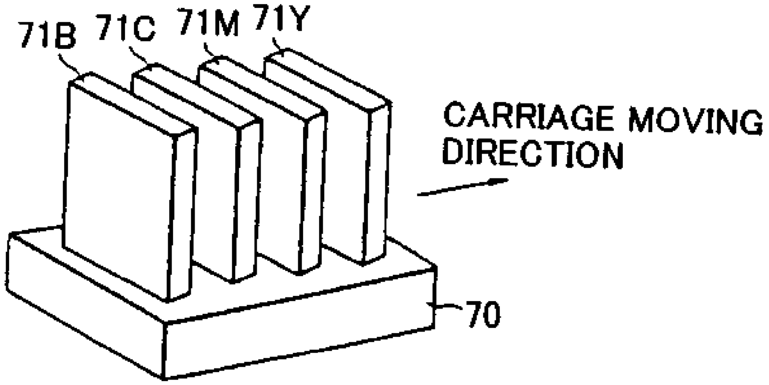
FIG. 13 is a view showing an example of nozzle elements (recording heads) for four colors being separately formed and aligned on a carriage.

Conventionally, a color inkjet recording apparatus has a plurality of the recording heads aligned on a carriage 70 (see FIG. 13) where each of the recording heads (such as the recording head shown in FIG. 1) is filled with a single color. In FIG. 13, numerals 71B, 71C, 71M, and 71Y indicate recording heads for ejecting color ink of black, cyan, magenta, and yellow. One reason for aligning the recording heads in such manner is because it is convenient in taking measures against clogging. For example, in a case where one of the recording heads 71B, 71C, 71M, or 71Y shown in FIG. 13 becomes clogged, the problem of clogging can be overcome by replacing the clogged recording head. This is possible since the recording heads are disposed separately on the carriage.

Meanwhile, in the present invention, the recording heads (nozzle elements) for ejecting plural colors are integrally formed into a united body. Therefore, from the aspect of taking measures against clogging, separately aligning the recording heads as shown in FIG. 13 may seem more convenient compared to integrally forming the recording heads. However, the present invention requires no such alignment since the pigment particle diameter, the amount of pigment in the ink, and the amount of solid content in the ink are optimized so that the present invention can be free from the clogging problem. Therefore, as shown in FIGS. 8 through 12, the liquid jet head has recording heads (nozzle elements) integrally formed to thereby reduce assembly cost, achieve size reduction, and heighten precision in dot arrangement for various colors.

Figure 14A:
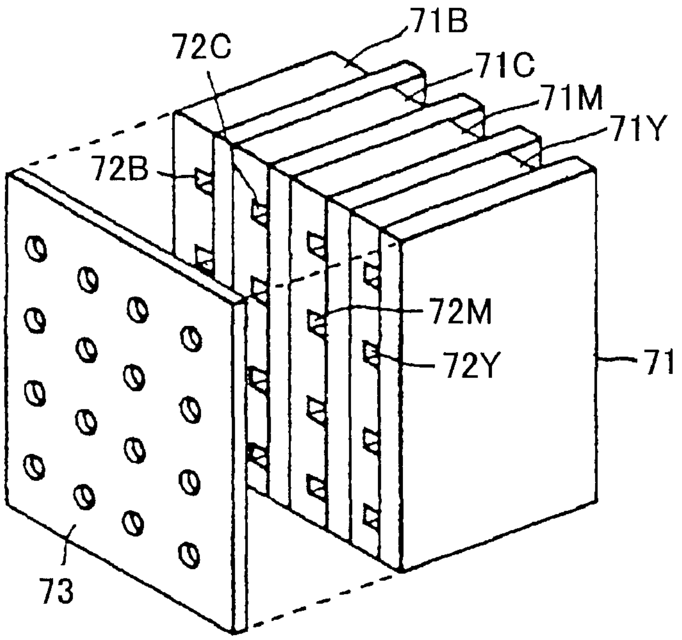
FIGS. 14A and 14B are views showing an example of nozzle elements (recording heads) for plural colors being integrally formed in a stacked manner.
Figure 14B:
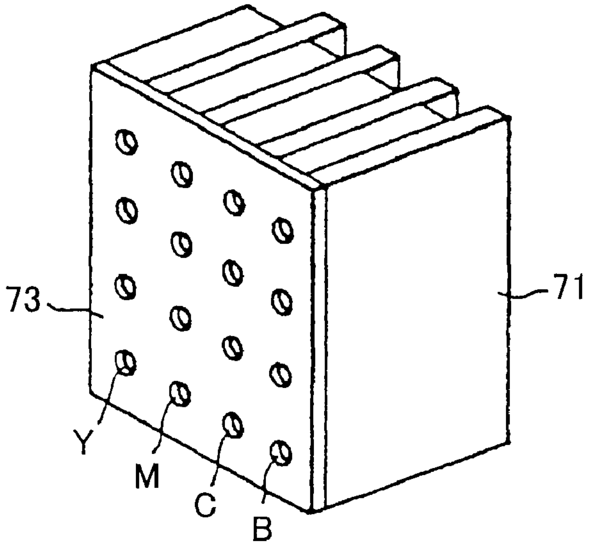

The liquid jet head shown in FIGS. 8 through 12 is merely one example of nozzle elements (recording heads) integrally formed as a united body in which the heating element substrate serves as a common base plate for the nozzle elements (recording heads) disposed thereon. In another example where nozzle elements (recording heads) are integrally formed, nozzle elements 71B, 71C, 71M, and 71Y are stacked on each other in a manner shown in FIGS. 14A and 14B. In this example, a nozzle plate 73 is disposed on the tip portions of the flow paths 72B, 72C, 72M, and 72Y to serve as a common nozzle plate for the flow paths 72B, 72C, 72M, and 72Y (FIG. 14A is a perspective view showing a state before attachment of the nozzle plate 73, and FIG. 14B is a perspective view showing a state after the attachment of the nozzle plate 73). Since the common nozzle plate 73 having orifices perforated with high accuracy is assembled to provide an integrally formed liquid jet head, not only can manufacture cost be reduced, but positional precision of color dots can be improved.

Figure 15A:
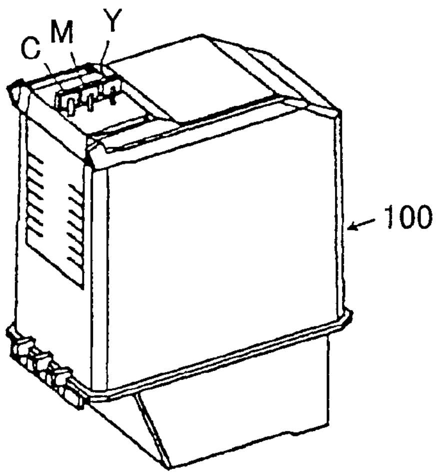
FIGS. 15A and 15B are views showing an example where a head unit has a recording head portion integrally formed with a recording liquid container portion.
Figure 15B:
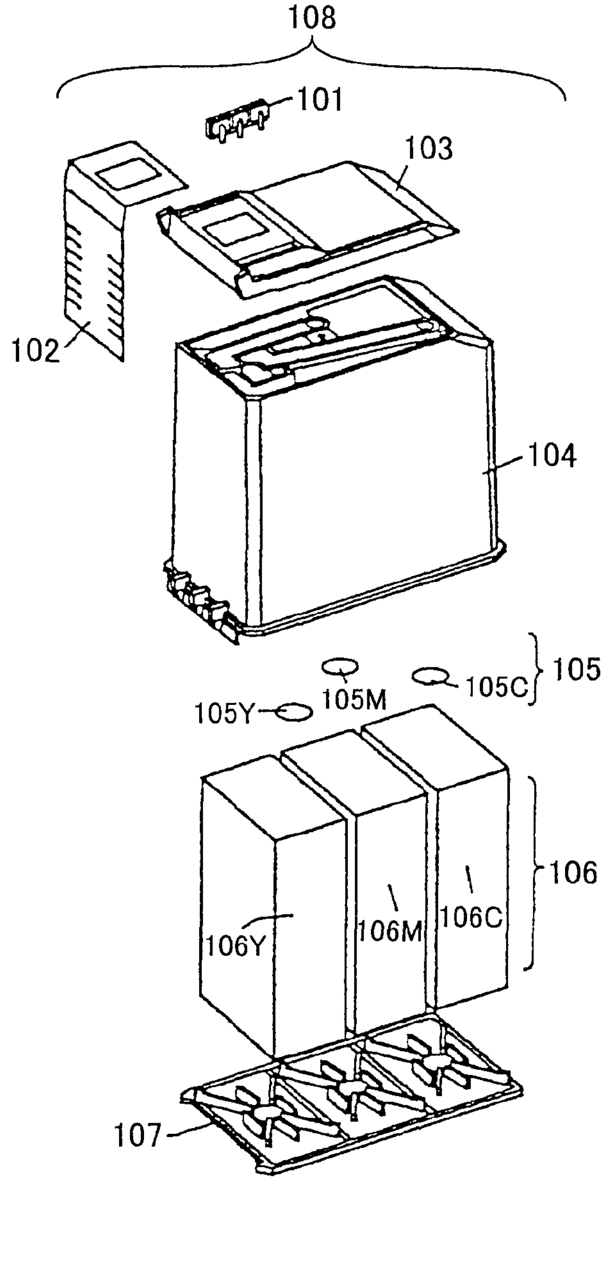

FIGS. 15A and 15B show another example of a liquid jet head, in which the liquid jet head has a head unit having a recording head portion integrally formed with a recording liquid container portion. The head unit is a unit including a plurality of recording heads (nozzle elements) integrally formed for ejecting plural colors of ink (in this embodiment, yellow, magenta, and cyan). FIG. 15A is an entire perspective view and FIG. 15B is an exploded perspective view. In the drawings, numeral 100 indicates the head unit, numeral 108 indicates the recording head portion, numeral 101 indicates a head chip, numeral 102 indicates a printed circuit, numeral 103 indicates a cover plate, numeral 104 indicates the ink container portion, numeral 105 (105Y, 105M and 105C) indicates a stainless mesh filter, numeral 106 (including 106Y, 106M, 106C) indicates a foam material, and numeral 107 indicates a bottom plate. In the example, the ink container portion 104, which communicates with the head unit 100, has an inside thereof divided into three portions for allowing yellow, magenta, and cyan ink to be respectively filled therein. Since the recording head unit comprising a plurality of recording heads (nozzle elements) can be provided in a compact form, only a small carriage would be required for mounting the head unit thereon. In addition, the motor for driving the carriage can be formed with a small size as well, to thereby save energy.

Figure 16A:
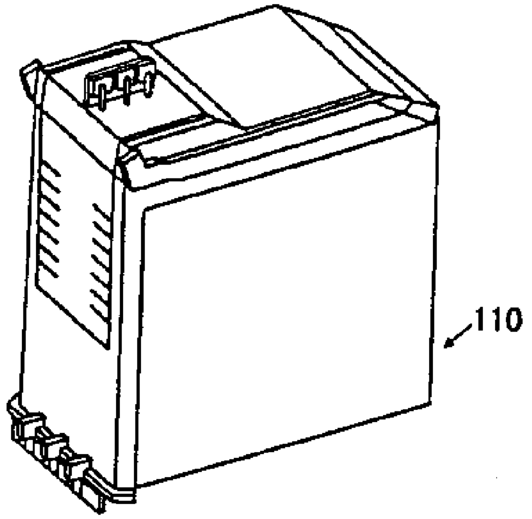
FIGS. 16A and 16B are views showing an example where a head unit has a recording head portion detachably formed with a recording liquid container portion.
Figure 16B:
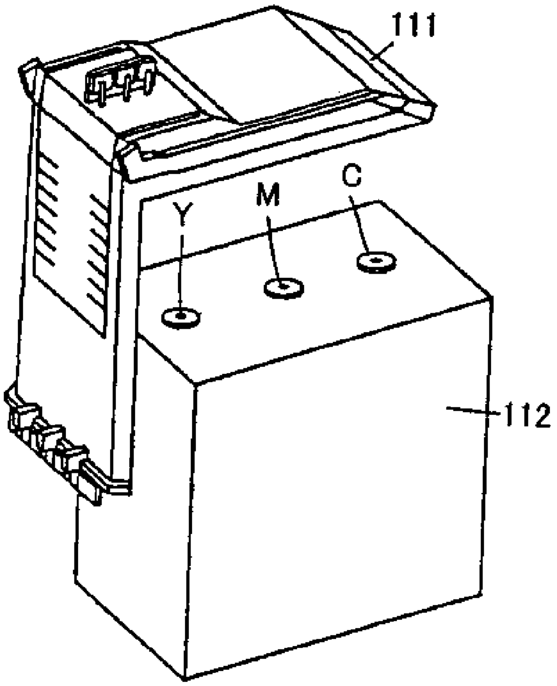

FIGS. 16A and 16B show another example of a liquid jet head, in which an ink container portion is detachably attached to a recording head portion of a recording head unit similar to the one shown in FIG. 15. FIG. 16A is an entire perspective view of a head unit 110, and FIG. 16B is a perspective view showing the head unit 110 separated into a recording head portion 111 and an ink containing portion 112. With this example, even where a large amount of color ink is consumed, ink can be supplied simply by replacing the ink container portion 112, to thereby provide cost efficiency. In addition, the advantages of the united liquid jet head described in FIG. 15 can be maintained.

Figure 17A:
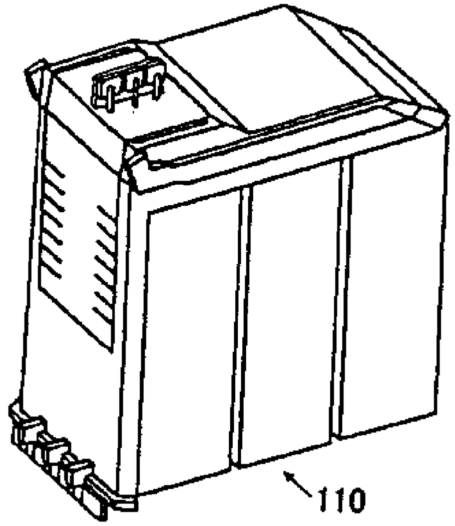
FIGS. 17A and 17B are views showing an example where a recording liquid portion is detachable according to color of ink.
Figure 17B:
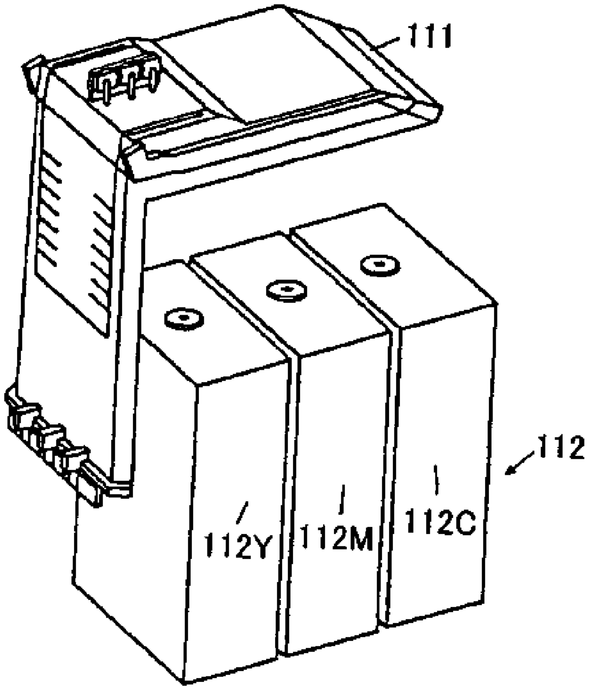

FIGS. 17A and 17B show another example of a liquid jet head, in which a head unit has separate detachable ink container portions corresponding to each color so that each ink container portion can be detached separately from a recording head portion the according to color. FIG. 17A is an entire perspective view of the recording head unit, and FIG. 17B is a perspective view showing a head unit 110 separated into a recording head portion 111 and a recording container portion 112 (112Y, 112M, 112C). Since ink for each color are not always consumed at the same rate, there may be a case where there is no supply of one color ink while there still is a supply for the other color inks. In such case, replacement of the entire ink container portion would be necessary where the example illustrated with FIGS. 15A and 15B or the example illustrated with FIGS. 16A and 16B is used. This is undesirable from an aspect of running cost. Meanwhile, with the example illustrated in FIGS. 17A and 17B, it would only be necessary to replace the ink container portion which is short of ink. Thereby, running cost can be reduced.

Although the present invention has been described by using examples employing a bubble inkjet recording method, the present invention may also be applied to other recording methods in which pigment-based ink is ejected from fine sized discharge ports. Furthermore, the present invention may be applied not only to a recording head for recording with a single color ink, but a recording head for recording with plural colors of ink (multi color recording).

In consequence, the present invention, which relates to an inkjet recording head of an inkjet recording apparatus for ejecting ink with pigment particles dispersed therein, is able to provide an inkjet recording head with a fine sized discharge port (unlike any known conventional art) having an orifice diameter of ϕ25 μm or less by optimizing pigment particle diameter in relation to the orifice diameter of the discharge port, in relation to paper serving as the recording medium, and in relation to the spaces between the fibers of the paper. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an inkjet recording head of an inkjet recording apparatus for ejecting ink with pigment particles dispersed therein, is able to provide an inkjet recording head with a fine sized discharge port (unlike no other conventional art) having an orifice diameter of ϕ25 μm or less by optimizing pigment particle diameter in relation to the orifice diameter of the discharge port, in relation to a coated paper serving as the recording medium, and in relation to particles composing the material of the coated paper. Accordingly, the present invention is able to achieve high precision recording, provide-satisfactory water fastness and light fastness, eliminate clogging in the discharge port, provide excellent pixel shape, and fulfill high quality recording.

Furthermore, the present invention, which relates to an inkjet recording head of an inkjet recording apparatus for ejecting ink with pigment particles dispersed therein, is able to provide an inkjet recording head with a fine sized discharge port (unlike no other conventional art) having an orifice diameter of ϕ25 μm or less by optimizing pigment particle diameter in relation to the orifice diameter of the discharge port, in relation to a resin material serving as the recording medium, and in relation to particles composing the material of the resin material. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an inkjet recording head of an inkjet recording apparatus for ejecting ink with pigment particles dispersed therein, is able to obtain an ink with a sufficient density and stably disperse the pigment therein by optimizing the amount of pigment particles in the ink and the amount of solid content in the ink. Accordingly, the present invention is able to provide satisfactory water fastness and light fastness, eliminate clogging in the discharge port, provide excellent pixel shape, and achieve high quality recording.

Furthermore, even in a case where pigments for various colors are employed, the pigments can stably disperse in the ink without causing the problem of clogging since the amount of pigment particles in the ink and the amount of solid content in the ink are optimized. Accordingly, the present invention is able to achieve high precision color recording unlike no other conventional art and provide satisfactory water fastness and light fastness.

With the present invention, a color inkjet head can be formed into a small size by integrally forming a plurality of recording heads (nozzle elements) into a united body to thereby obtain a single recording head unit. Therefore, neither a bulky carriage for mounting the recording head unit nor a bulky motor for the carriage are required.

Usually, in a case where a recording head unit is formed with plural recording heads integrally formed into a single body, the recording head unit may encounter clogging due to the large number of discharge ports (especially in comparison with the discharge ports of a single color recording head) and the wide variety of color pigments used for the recording head unit. However, the recording head unit of the present invention is free from the problem of clogging since the amount of pigment particles in the ink and the amount of solid content in the ink are optimized. Accordingly, the present invention is able to achieve high precision color recording and provide satisfactory water fastness and light fastness.

In addition to integrally forming the plural recording heads to thereby form a recording head unit, the recording head unit of the present invention can be compactly assembled further by integrally forming a recording head portion thereof with an ink container portion. This allows handling of the recording head unit to be easier.

Furthermore, running cost can be reduced by detachably attaching the ink container portion to the recording head portion.

Furthermore, running cost can be further reduced by allowing the ink container portion to detach from the recording head portion according to each color (type) of ink.

Furthermore, the present invention can be employed even under harsh conditions of a thermal inkjet method by using the recording conditions of the present invention. Accordingly, ink can be stably ejected without clogging to thereby achieve high quality recording.

Furthermore, since the recording head portion of the present invention can be manufactured with a semiconductor manufacturing process, a fine size discharge port (unlike no other conventional art) of ϕ25 μm or less can be employed. Accordingly, the liquid jet head of the present invention is able to eject ink with high precision. Even when the liquid jet head of the present invention is provided with fine sized heating elements and discharge port portions, the liquid jet head can be manufactured easily in a compact size with sufficient containing space. Therefore, the liquid jet head can be manufactured inexpensively.

Furthermore, the present invention, which relates also to an inkjet recording apparatus for ejecting ink with pigment particles dispersed therein, is able to provide an inkjet recording head with a fine sized discharge port (unlike no other conventional art) having an orifice diameter of ϕ25 μm or less by optimizing pigment particle diameter in relation to the orifice diameter of the discharge port, in relation to paper serving as the recording medium, and in relation to the spaces between the fibers of the paper. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an inkjet recording apparatus for ejecting ink with pigment particles dispersed therein, is able to provide an inkjet recording head with a fine sized discharge part (unlike no other conventional art) having an orifice diameter of ϕ25 μm or less by optimizing pigment particle diameter in relation to the orifice diameter of the discharge port, in relation to a coated paper serving as the recording medium, and in relation to particles composing the material of the coated paper. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an inkjet recording apparatus for ejecting ink with pigment particles dispersed therein, is able to provide an inkjet recording head with a fine sized discharge port (unlike no other conventional art) having an orifice diameter of ϕ25 μm or less by optimizing pigment particle diameter in relation to the orifice diameter of the discharge port, in relation to a resin material serving as the recording medium, and in relation to particles composing the material of the resin material. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an inkjet recording apparatus for ejecting ink with pigment particles dispersed therein, is able to obtain an ink with a sufficient density and stably disperse the pigment therein by optimizing the amount of pigment particles in the ink and the amount of solid content in the ink. Accordingly, the present invention is able to provide satisfactory water fastness and light fastness, eliminate clogging in the discharge port, provide excellent pixel shape, and achieve high quality recording.

Furthermore, the present invention, which relates also to an ink (recording liquid) with pigment particles dispersed therein, is able to used for an inkjet recording head with a fine sized discharge port (unlike no other conventional art) having an orifice diameter of ϕ25 μm or less by optimizing pigment particle diameter in relation to the orifice diameter of the discharge port, in relation to paper serving as the recording medium, and in relation to the spaces between the fibers of the paper. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an ink (recording liquid) with pigment particles dispersed therein, is able to be used for an inkjet recording head with a fine sized discharge port (unlike no other conventional art) having an orifice diameter of ϕ25 μm or less by optimizing pigment particle diameter in relation to the orifice diameter of the discharge port, in relation to a coated paper serving as the recording medium, and in relation to particles composing the material of the coated paper. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an ink (recording liquid) with pigment particles dispersed therein, is able to be used for an inkjet recording head with a fine sized discharge port (unlike no other conventional art) having an orifice diameter of ϕ25 μm or less by optimizing pigment particle diameter in relation to the orifice diameter of the discharge port, in relation to a resin material serving as the recording medium, and in relation to particles composing the material of the resin material. Accordingly, the present invention is able to achieve high precision recording, provide satisfactory water fastness and light fastness, eliminate clogging in the discharge port, provide excellent pixel shape, and fulfill high quality recording.

Furthermore, the present invention, which relates to an ink (recording liquid) with pigment particles dispersed therein, is able to serve as an ink with a sufficient density and stably disperse the pigment therein by optimizing the amount of pigment particles in the ink and the amount of solid content in the ink. Accordingly, the present invention is able to provide satisfactory water fastness and light fastness, eliminate clogging in the discharge port, provide excellent pixel shape, and achieve high quality recording.

Further, the present invention is not limited to these embodiments, but various variations and modifications may be made without departing from the scope of the present invention.

The present application is based on Japanese priority application No. 2002-266064 filed on Sep. 11, 2002 with the Japanese Patent Office, the entire contents of which are hereby incorporated by reference.

What is claimed is:

1. A liquid jet head comprising:

a nozzle plate formed of nozzles from which a liquid is ejected to a receiving medium, said nozzles being arranged to provide a density same as that of a flow path of the liquid jet head, wherein the liquid contains fine particles, wherein the fine particles contained in the liquid are no less than 1% by weight, wherein each of the nozzles has an area that is less than 500 $\mu m^2$, wherein each of the fine particles has a diameter satisfying a relation of $0.0005 \leqq Dp/Do \leqq 0.02$, wherein "Dp" represents the diameter of each of the fine particles and "Do" represents a size of each of the nozzles, wherein when the nozzle element ejects the liquid onto the receiving medium, a contact angle of the liquid stops changing when 100 ms or less elapses after the liquid contacts the receiving medium, wherein the receiving medium is a resin material and has a surface, and wherein the average diameter of the fine particles is smaller than smoothness of the surface of the receiving medium.

2. The liquid jet head as claimed in claim 1, wherein the fine particles are dispersed in the liquid by including a dispersant in the liquid.

3. The liquid jet head as claimed in claim 1, wherein the fine particles are dispersed in the liquid by surface processing the Fine particles.

4. The liquid jet head as claimed in claim 1, wherein the fine particles contained in the liquid range from 2% to 10% by weight, wherein a solid content of the liquid including the fine particles contained in the liquid is no more than 15% by weight.

5. The liquid jet head as claimed in claim 1, further comprising one or more other nozzle elements respectively having nozzles from which one or more other liquids are ejected to the receiving medium.

6. The liquid jet head us claimed in claim 5, wherein the one or more other nozzle elements are integrally formed to thereby form a head unit.

7. The liquid jet head as claimed in claim 6, wherein the head unit has a head portion and a liquid container portion, wherein the head portion nod the liquid container portion are integrally formed.

8. The liquid jet head as claimed in claim 6, wherein the head unit has a head portion and a liquid container portion.

wherein the liquid container portion is detachably attached to the head portion.

9. The liquid jet head as claimed in claim 8, wherein the liquid container portion is detachable according to type of the one or more other liquids.

10. The liquid jet head as claimed in claim 1, wherein the liquid jet head employs a thermal liquid jet method which uses heat for ejecting liquid therefrom.

11. A liquid jet apparatus comprising:

a liquid jet head including a nozzle plate formed of nozzles from which a liquid is ejected to a receiving medium, said nozzles being arranged to provide a density same as that of a flow path of the liquid jet head;

a carriage mounting the liquid jet head;

a guiding rod guiding the carriage;

a conveying roller conveying the receiving medium; and a holding roller holding the receiving medium, wherein the liquid contains fine particles, wherein the fine particles contained in the liquid are no less than 1% by weight, wherein each of the nozzles has an area that is less than 500 $\mu m^2$, wherein each of the fine particles has a diameter satisfying a relation of $0.0005 \leqq Dp/Do \leqq 0.02$, wherein "Dp" represents the diameter of each of the fine particles and "Do" represents a size of each of the nozzles, wherein when the nozzle element ejects the liquid onto the receiving medium, a contact angle of the liquid stops changing when 100 ms or less elapses after the liquid contacts the receiving medium, wherein the receiving medium is a resin material and has a surface, and wherein the average diameter of the fine particles is smaller than smoothness of the surface of the receiving medium.

12. The liquid jet apparatus as claimed in claim 11, wherein the fine particles are dispersed in the liquid by including a dispersant in the liquid.

13. The liquid jet apparatus as claimed in claim 11, wherein the fine particles are dispersed in the liquid by surface processing the fine particles.

14. The liquid jet apparatus as claimed in claim 11, wherein the fine particles contained in the liquid range from 2% to 10% by weight, wherein a solid content of the liquid including the fine particles contained in the liquid is no more than 15% by weight.

15. A liquid used in a liquid jet head including a nozzle plate formed of nozzles from which a liquid is ejected to a receiving medium, said nozzles being arranged to provide a density same as that of a flow path of the liquid jet head, the liquid comprising:

fine particles, wherein the fine particles contained in the liquid are no less than 1% by weight, wherein each of the nozzles has an area that is less than 500 $\mu m^2$, wherein each of the fine particles has a diameter satisfying a relation of $0.0005 \leqq Dp/Do \leqq 0.02$, wherein "Dp" represents the diameter of each of the fine particles and "Do" represents a size of each of the nozzles.

wherein when the nozzle element ejects the liquid onto the receiving medium, a contact angle of the liquid stops changing when 100 ms or less elapses after the liquid contacts the receiving medium, wherein the receiving medium is a resin material and has a surface, and wherein the average diameter of the fine particles is smaller than smoothness of the surface of the receiving medium.

16. The liquid as claimed in claim 15, wherein the fine particles are dispersed in the liquid by including a dispersant in the liquid.

17. The liquid as claimed in claim 15, wherein the fine particles are dispersed in the liquid by surface processing the fine particles.

18. The liquid as claimed in claim 15, wherein the fine particles contained in the liquid range from 15% to 10% by weight, wherein a solid content of the liquid including the fine particles contained in the liquid is no more than 15% by weight.

* * * * *